(12) United States Patent
Chen

(10) Patent No.: US 11,391,923 B2
(45) Date of Patent: Jul. 19, 2022

(54) OPTICAL PHOTOGRAPHING LENS ASSEMBLY, IMAGE CAPTURING DEVICE AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 145 days.

(21) Appl. No.: 16/798,486

(22) Filed: Feb. 24, 2020

(65) Prior Publication Data

US 2020/0192067 A1 Jun. 18, 2020

Related U.S. Application Data

(63) Continuation of application No. 16/275,515, filed on Feb. 14, 2019, now Pat. No. 10,613,302, which is a (Continued)

(30) Foreign Application Priority Data

Dec. 30, 2014 (TW) .................................. 103146327

(51) Int. Cl.
*G02B 13/00* (2006.01)
*G02B 9/62* (2006.01)
*H04N 5/225* (2006.01)

(52) U.S. Cl.
CPC .......... *G02B 13/0045* (2013.01); *G02B 9/62* (2013.01); *H04N 5/2253* (2013.01)

(58) Field of Classification Search
CPC ... G02B 3/00; G02B 3/02; G02B 3/04; G02B 3/06; G02B 3/08; G02B 9/00; G02B 9/02;
(Continued)

(56) References Cited

U.S. PATENT DOCUMENTS 6,064,531 A 5/2000 Ishii et al.
8,432,619 B2 4/2013 Huang
(Continued)

FOREIGN PATENT DOCUMENTS

CN 103676089 A 3/2014
CN 105467562 A 4/2016
(Continued)

*Primary Examiner* — Thomas K Pham
*Assistant Examiner* — Henry A Duong
(74) *Attorney, Agent, or Firm* — McClure, Qualey & Rodack, LLP

(57) ABSTRACT

An optical photographing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has refractive power. The third lens element has refractive power. The fourth lens element has refractive power. The fifth lens element with refractive power has an image-side surface being convex in a paraxial region thereof, wherein an object-side surface and the image-side surface of the fifth lens element are both aspheric. The sixth lens element with refractive power has an object-side surface and an image-side surface being both aspheric. The optical photographing lens assembly has a total of six lens elements with refractive power.

27 Claims, 16 Drawing Sheets

Related U.S. Application Data continuation of application No. 15/632,510, filed on Jun. 26, 2017, now Pat. No. 10,241,303, which is a continuation of application No. 14/684,579, filed on Apr. 13, 2015, now Pat. No. 9,726,857.

(58) Field of Classification Search
CPC ... G02B 9/04; G02B 9/06; G02B 9/08; G02B 9/10; G02B 9/12; G02B 9/14; G02B 9/16; G02B 9/18; G02B 9/20; G02B 9/22; G02B 9/26; G02B 9/28; G02B 9/30; G02B 9/32; G02B 9/34; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/58; G02B 9/60; G02B 9/62; G02B 9/64; G02B 13/00; G02B 13/002; G02B 13/0045; G02B 9/24; G03B 30/00; H04N 5/2253
USPC .......................................................... 359/713
See application file for complete search history.

(56) References Cited

U.S. PATENT DOCUMENTS

| | | | |
|---|---|---|---|
| 9,019,635 | B2 | 4/2015 | Tsai et al. |
| 9,316,811 | B2 | 4/2016 | Chen |
| 2002/0135890 | A1 | 9/2002 | Tochigi |
| 2012/0188654 | A1 | 7/2012 | Huang |
| 2012/0243108 | A1 | 9/2012 | Tsai et al. |
| 2014/0063323 | A1 | 3/2014 | Yamazaki et al. |
| 2014/0063618 | A1 | 3/2014 | Park et al. |
| 2015/0062405 | A1 | 3/2015 | Chen et al. |
| 2015/0070784 | A1 | 3/2015 | Chen et al. |
| 2015/0085378 | A1 | 3/2015 | Jung et al. |
| 2015/0146086 | A1 | 5/2015 | Liao |
| 2015/0247989 | A1 | 9/2015 | Sakai |
| 2015/0248016 | A1 | 9/2015 | Sakai |
| 2015/0362703 | A1 | 12/2015 | Park |
| 2016/0041370 | A1 | 2/2016 | Lee et al. |
| 2016/0077332 | A1 | 3/2016 | Baba et al. |
| 2016/0085052 | A1 | 3/2016 | Park |
| 2016/0131874 | A1* | 5/2016 | Tang .................. G02B 13/0045 359/708 |
| 2017/0023769 | A1 | 1/2017 | Jo |
| 2019/0346667 | A1 | 11/2019 | Kuobota et al. |

FOREIGN PATENT DOCUMENTS

| | | |
|---|---|---|
| JP | S60-201313 A | 10/1985 |
| JP | S61-208020 A | 9/1986 |
| JP | S63-96619 A | 4/1988 |
| JP | H07-181380 A | 7/1995 |
| JP | H09-49968 A | 2/1997 |
| JP | 11311740 A | 11/1999 |
| JP | 2010-145648 A | 7/2010 |
| JP | 2014010399 A | 1/2014 |
| JP | 2014010400 A | 1/2014 |
| JP | 2014010401 A | 1/2014 |
| KR | 10-2010-0040357 | 4/2010 |
| TW | 201350901 A | 12/2013 |
| TW | 201411182 A | 3/2014 |
| TW | 201413320 A | 4/2014 |
| TW | I439720 | 6/2014 |

\* cited by examiner

OPTICAL PHOTOGRAPHING LENS ASSEMBLY, IMAGE CAPTURING DEVICE AND ELECTRONIC DEVICE

RELATED APPLICATIONS

This application is a continuation of U.S. application Ser. No. 16/275,515, filed on Feb. 14, 2019, now U.S. Pat. No. 10,613,302, which is a continuation of U.S. application Ser. No. 15/632,510, filed on Jun. 26, 2017, U.S. Pat. No. 10,241,303, issued on Mar. 26, 2019, which is a continuation of U.S. application Ser. No. 14/684,579, filed on Apr. 13, 2015, U.S. Pat. No. 9,726,857 issued on Aug. 8, 2017, which claims priority to Taiwan Application Serial Number 103146327, filed on Dec. 30, 2014, all of which are herein incorporated by reference.

BACKGROUND

Technical Field

The present disclosure relates to an optical photographing lens assembly and an image capturing device. More particularly, the present disclosure relates to a compact optical photographing lens assembly and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the arrangement of the refractive power of the first lens element in the optical system does not give effect to shift the entire refractive powers toward the object side, so that the arrangement of the small field of view and the shortened back focal length cannot be both obtained, and the stray light would be easily generated. Moreover, the shape of the fifth lens element also cannot reduce the generation of the stray light and is also unfavorable for providing high image quality.

SUMMARY

According to one aspect of the present disclosure, an optical photographing lens assembly comprising, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has refractive power. The third lens element has refractive power. The fourth lens element has refractive power. The fifth lens element with refractive power has an image-side surface being convex in a paraxial region thereof, wherein an object-side surface and the Image-side surface of the fifth lens element are both aspheric. The sixth lens element with refractive power has an object-side surface and an image-side surface being both aspheric. The optical photographing lens assembly has a total of six lens elements with refractive power. There is an air space between any two lens elements of the first lens element, the second lens element, the third lens element, the fourth lens element, the fifth lens element and the sixth lens element that are adjacent to each other, and there is no relative movement among the lens elements with refractive power. The optical photographing lens assembly further includes a is stop located between an imaged object and the third lens element. When a focal length of the optical photographing lens assembly is f, a maximum image height of the optical photographing lens assembly is ImgH, and a curvature radius of the image-side surface of the fifth lens element is R10, the following conditions are satisfied:

$$2.0 < f/ImgH; \text{ and}$$

$$-1.25 < R10/f < 0.$$

According to another aspect of the present disclosure, an image capturing device includes the optical photographing lens assembly according to the aforementioned aspect and an image sensor, wherein the image sensor is disposed on an image surface of the optical photographing lens assembly.

According to further another aspect of the present disclosure, an electronic device includes the image capturing device according to the aforementioned aspect.

According to yet another aspect of the present disclosure, an optical photographing lens assembly comprising, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has refractive power. The third lens element has refractive power. The fourth lens element has refractive power. The fifth lens element with refractive power has an image-side surface being convex in a paraxial region thereof, wherein an object-side surface and the image-side surface of the fifth lens element are both aspheric. The sixth lens element with refractive power has an image-side surface being concave in a paraxial region thereof, wherein an object-side surface and the image-side surface of the sixth lens element are both aspheric. The optical photographing lens assembly has a total of six lens elements with refractive power. There is an air space between any two lens elements of the first lens element, the second lens element, the third lens element, the fourth lens element, the fifth lens element and the sixth lens element that are adjacent to each other, and there is no relative movement among the lens elements with refractive power. The optical photographing lens assembly further includes a stop located between an imaged object and the third lens element. When a focal length of the optical photographing lens assembly is f, a maximum image height of the optical photographing lens assembly is ImgH, and a curvature radius of the image-side surface of the fifth lens element is R10, the following conditions are satisfied:

2.0<f/ImgH; and

R10/f<0.

DETAILED DESCRIPTION

Figure 1:
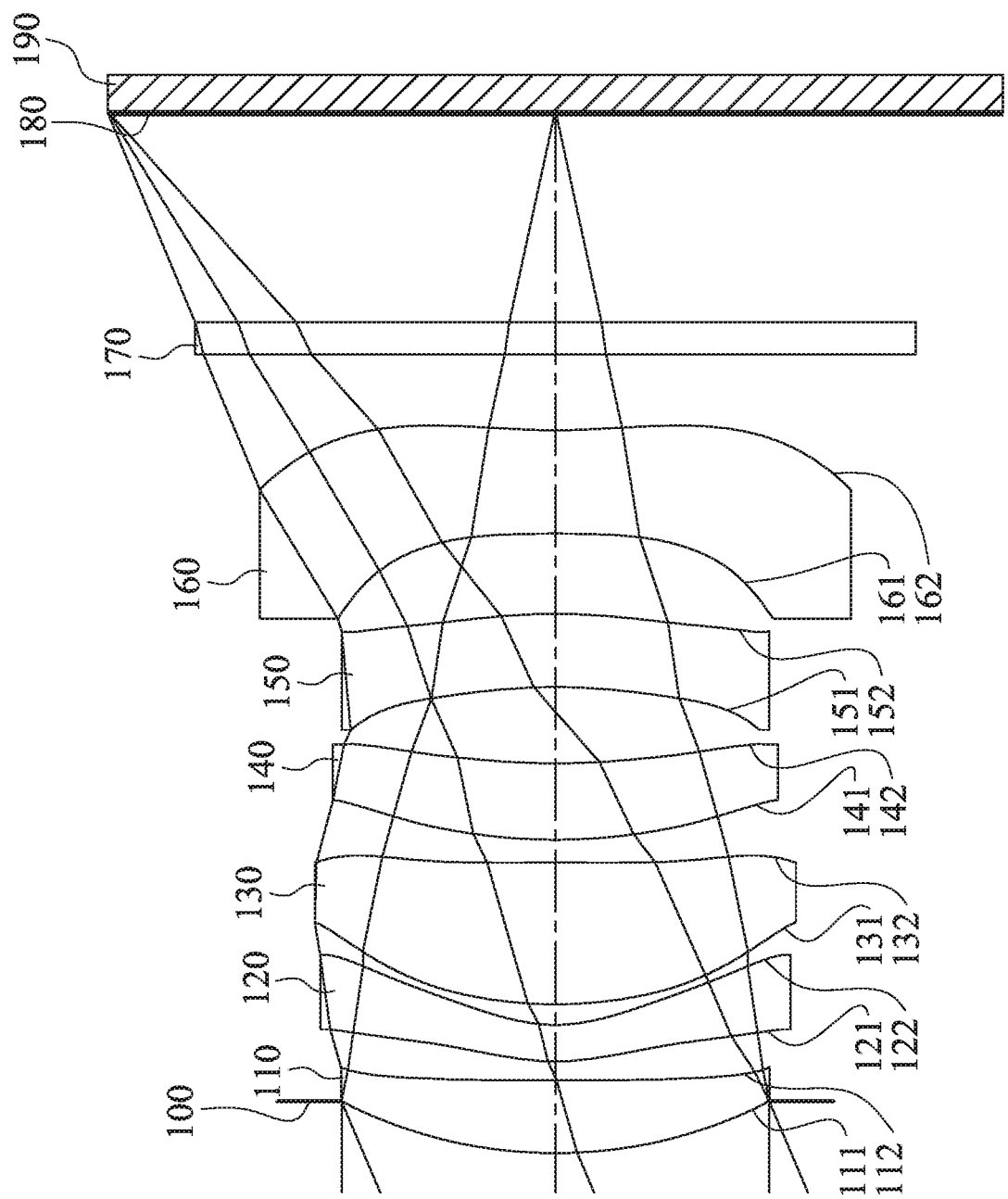
FIG. 1 is a schematic view of an image capturing device according to the 1st embodiment of the present disclosure.

An optical photographing lens assembly includes, in order from an object side to an image side, a first lens element, a second lens element, a third lens element, a fourth lens element, a fifth lens element and a sixth lens element, wherein the optical photographing lens assembly has a total of six lens elements with refractive power, and there is no relative movement among the lens elements with refractive power. The optical photographing lens assembly further includes a stop, such as an aperture stop located between an imaged object and the third lens element.

There is an air space between any two lens elements of the first lens element, the second lens element, the third lens element, the fourth lens element, the fifth lens element and the sixth lens element that are adjacent to each other. That is, each of the first through sixth lens elements is a single and non-cemented lens element, and any two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element, the fifth lens element and the sixth lens element of the optical photographing lens assembly, there is a space in a paraxial region between every pair of lens elements that are adjacent to each other. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the optical photographing lens assembly. Therefore, according to the optical photographing lens assembly of the present disclosure, an air space in a paraxial region between any two of the first lens element, the second lens element, the third lens element, the fourth lens element, the fifth lens element and the sixth lens element that are adjacent to each other of the present disclosure improves the problem generated by the cemented lens elements.

The first lens element with positive refractive power has an object-side surface being convex in a paraxial region thereof. By such arrangement, the entire refractive powers of the optical photographing lens assembly can be given effect to shift towards the object side thereof, therefore the back focal length thereof can be reduced and the arrangement of the small field of view can be obtained for reducing the incident angle of the light. Hence, the stray light, such as the light generated by the specular reflection, can be avoided.

The second lens element can have negative refractive power, so that the aberration of the optical photographing lens assembly can be corrected for enhancing the image quality.

The third lens element can have an image-side surface being concave in a paraxial region thereof, so that the aberration of the optical photographing lens assembly can be corrected.

The fifth lens element can have positive refractive power, and has an image-side surface being convex in a paraxial region thereof. Therefore, the photosensitivity of the optical photographing lens assembly can be reduced. Further, the surface shape in the paraxial region of the image-side surface of the fifth lens element is also favorable for decreasing the stray light and enhancing the moldability of the lens element by reducing the variation of the surface shape of the fifth lens element.

The sixth lens element can have an image-side surface being concave in a paraxial region thereof and include at least one convex shape in an off-axial region thereof. Therefore, the principal point can be positioned away from the image surface of the optical photographing lens assembly so as to reduce the back focal length for keeping a compact size. Further, it is also favorable for reducing the incident angle of the off-axis field onto the image sensor so as to increase the responding efficiency of the image sensor.

According to the optical photographing lens assembly of the present disclosure, at least three surfaces of the object-side surface and the image-side surface of each of the first lens element, the second lens element, the third lens element, the fourth lens element and the fifth lens element have at least one inflection point. Therefore, the astigmatism and the aberration of the off-axis field can be effectively corrected.

Furthermore, according to the optical photographing lens assembly of the present disclosure, at least three lens elements of the first lens element, the second lens element, the third lens element, the fourth lens element, the fifth lens element and the sixth lens element have negative refractive power. Therefore, the aberration of the optical photographing lens assembly can be corrected for maintaining the image quality.

When a focal length of the optical photographing lens assembly is f, and a maximum image height of the optical photographing lens assembly is ImgH, the following condition is satisfied: $2.0 < f/ImgH$. Therefore, it is favorable for enhancing the image capturing ability on a specific region and obtaining the excellent telephoto ability by controlling the incident light of the optical photographing lens assembly which can be focused at a far and specific region. Preferably, the following condition can be satisfied: $2.15 < f/ImgH < 3.5$.

When the focal length of the optical photographing lens assembly is f, and a curvature radius of the image-side surface of the fifth lens element is R10, the following condition is satisfied: $R10/f < 0$. Therefore, the surface shape in the paraxial region of the image-side surface of the fifth lens element is favorable for decreasing the stray light and enhancing the moldability of the lens element by decreasing the variation of the surface shape of the fifth lens element. Preferably, the following condition can be satisfied: $-1.25 < R10/f < 0$. More preferably, the following condition can be satisfied: $-1.0 < R10/f < -0.1$.

When half of a maximal field of view of the optical photographing lens assembly is HFOV, the following condition is satisfied: $10.0$ degrees $< HFOV < 25.0$ degrees. Therefore, it is favorable for avoiding the generation of the stray light through proper field of view and the image capturing range.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and a sum of axial distances between each two lens elements of the first lens element, the second lens element, the third lens element, the fourth lens element, the fifth lens element and the sixth lens element which are adjacent to each other is ΣAT (ΣAT=T12+T23+T34+T45+T56), the following condition is satisfied: $5.0 < \Sigma AT/(T12+T23)$. Therefore, it is favorable for assembling the lens elements so as to increase the manufacturing yield rate.

When an axial distance from the object-side surface of the first lens element to the stop is Dr1s (when the axial point on the object-side surface of the first lens element is closer to the object side than the center of the stop, Dr1s is a positive value; when the axial point on the object-side surface of the first lens element is closer to the image side than the center of the stop, Dr1s is a negative value), an axial distance from the stop to an image-side surface of the first lens element is Dsr2 (when the center of the stop is closer to the object side than the axial point on the image-side surface of the first lens element, Dsr2 is a positive value; when the center of the stop is closer to the image side than the axial point on the image-side surface of the first lens element, Dsr2 is a negative value), and the following condition is satisfied: $0.60 < Dr1s/Dsr2$. Therefore, the variation of the refracted angle of the incident light can be reduced and the stray light can be also reduced since the first lens element shifts the refractive powers of the optical photographing lens assembly towards the object side.

When the focal length of the optical photographing lens assembly is f, and an axial distance between the object-side surface of the first lens element and an image surface is TL, the following condition is satisfied: $0.70 < TL/f < 1.15$. Therefore, it is favorable for keeping the optical photographing lens assembly compact.

When an axial distance between the stop and the image surface is SL, the axial distance between the object-side surface of the first lens element and the image surface is TL, the following condition is satisfied: $0.85 < SL/TL < 1.05$. Therefore, it is favorable for obtaining a balance between telecentricity and the functionality of wide viewing angle, and thereby the total track length will not be excessively long.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, wherein at least two of the V1, V2, V3, V4, V5 and V6 are smaller than 27. Therefore, it is favorable for correcting the chromatic aberration of the optical photographing lens assembly.

According to the optical photographing lens assembly of the present disclosure, the lens elements thereof can be made of glass or plastic material. When the lens elements are made of glass material, the distribution of the refractive powers of the optical photographing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical photographing len assembly can also be reduced.

According to the optical photographing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the optical photographing lens assembly of the present disclosure, the positive refractive power or the negative refractive power of a lens element or the focal length of the lens element, that is, refers to the refractive power or the focal length in a paraxial region of the lens element.

According to the optical photographing lens assembly of the present disclosure, the optical photographing lens assembly can include at least one stop, such as an aperture stop, a glare stop or a field stop. Said glare stop or said field stop is for eliminating the stray light and thereby improving the image resolution thereof.

According to the optical photographing lens assembly of the present disclosure, an image surface of the optical photographing lens assembly, based on the corresponding image sensor, can be flat or curved. In particular, the image surface can be a curved surface being concave facing towards the object side.

According to the optical photographing lens assembly of the present disclosure, an aperture stop can be configured as a front stop or a middle stop. A front stop disposed between an imaged object and the first lens element can provide a longer distance between an exit pupil of the optical photographing lens assembly and the image surface and thereby improves the image-sensing efficiency of an image sensor. A middle stop disposed between the first lens element and the image surface is favorable for enlarging the field of view of the optical photographing lens assembly and thereby provides a wider field of view for the same.

According to the optical photographing lens assembly of the present disclosure, the optical photographing lens assembly can be applied to 3D (three-dimensional) image capturing applications, in products such as digital cameras, mobile devices, digital tablets, smart TV, Internet monitoring device, motion sensing input device, driving recording systems, rear view camera systems, and wearable devices.

According to the present disclosure, an image capturing device is provided. The image capturing device includes the aforementioned optical photographing lens assembly and an image sensor, wherein the image sensor is disposed on the image side of the aforementioned optical photographing lens assembly, that is, the image sensor can be disposed on or near an image surface of the aforementioned optical photographing lens assembly. In the image capturing device, by the arrangement of the refractive power of the first lens element, the entire refractive powers of the optical photographing lens assembly can be given effect to shift towards the object side thereof, and it is favorable for reducing the back focal length and reducing the variation of the refraction angle when the lights enter the optical photographing lens assembly. Hence, the stray light, such as the light generated by the specular reflection, can be avoided. Furthermore, the surface shape in the paraxial region of the image-side surface of the fifth lens element is also favorable for decreasing the stray light and enhancing the moldability of the lens element by reducing the variation of the surface shape of the fifth lens element. Preferably, the image capturing device can further include a barrel member, a holding member or a combination thereof.

According to the present disclosure, an electronic device is provided. The electronic device includes the aforementioned image capturing device. Therefore, the image quality of the electronic device can be increased. Preferably, the electronic device can further include but not limited to a control unit, a display, a storage unit, a random access memory unit (RAM), a read only memory unit (ROM) or a combination thereof.

According to the above description of the present disclosure, the following 1st-9th specific embodiments are provided for further explanation.

1st Embodiment

Figure 2:
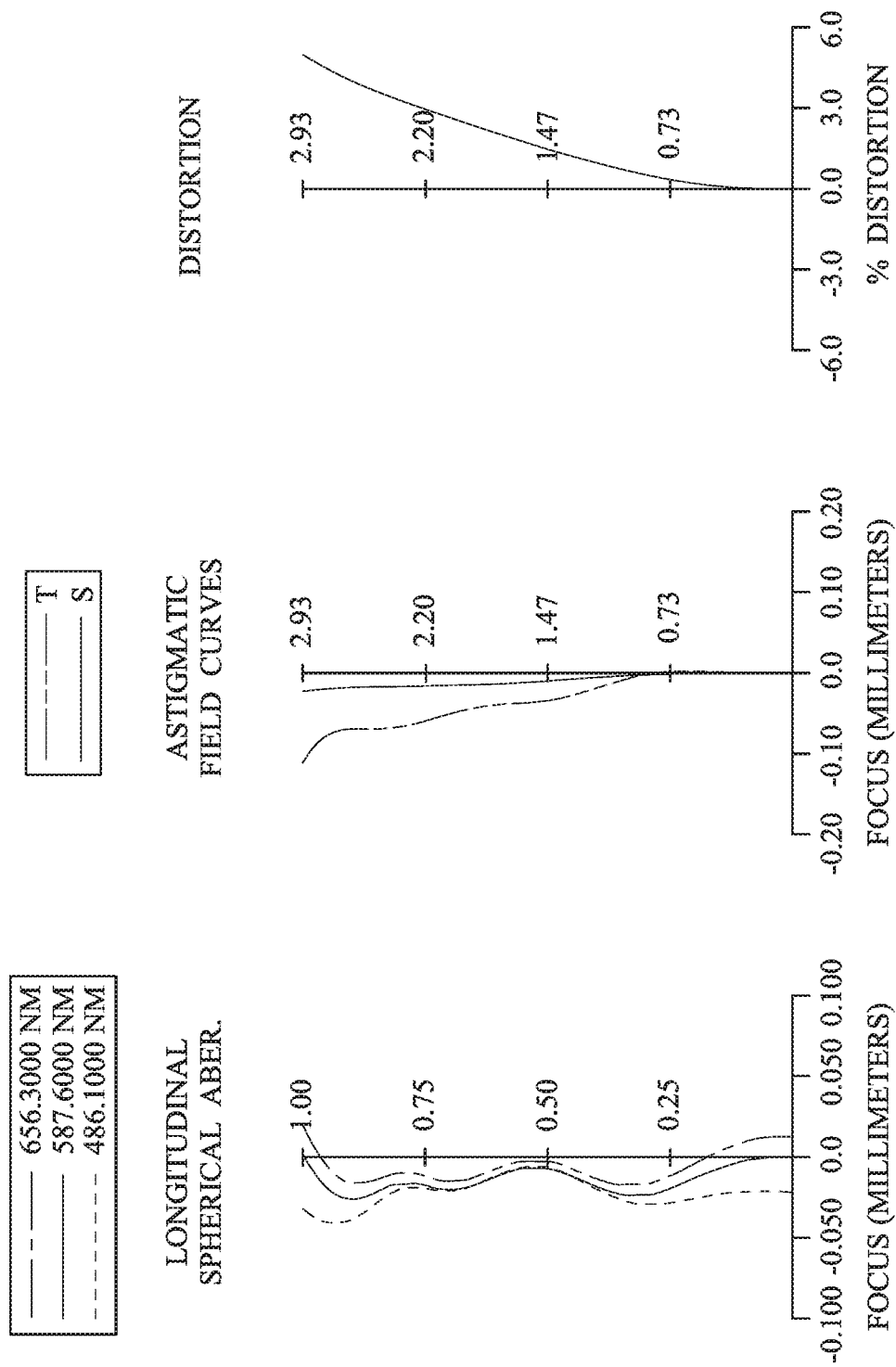
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an optical photographing lens assembly (its reference numeral is omitted) and an image sensor 190. The optical photographing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the image sensor 190 is disposed on the image surface 180 of the optical photographing lens assembly. The optical photographing lens assembly has a total of six lens elements (110-160) with refractive power. There is an air space in a paraxial region between any two of the first lens element 110, the second lens element 120, the third lens element 130, the fourth lens element 140, the fifth lens element 150, and the sixth lens element 160 that are adjacent to each other, and there is no relative movement among the lens elements (110-160) with refractive power.

The first lens element 110 with positive refractive power has an object-side surface 111 being convex in a paraxial region thereof and an image-side surface 112 being concave in a paraxial region thereof. The first lens element 110 is made of plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material, and has the object-side surface 121 and the image-side surface 122 being both aspheric. Furthermore, both of the object-side surface 121 and the image-side surface 122 of the second lens element 120 have at least one inflection point.

The third lens element 130 with positive refractive power has an object-side surface 131 being convex in a paraxial region thereof and an image-side surface 132 being convex in a paraxial region thereof. The third lens element 130 is made of plastic material, and has the object-side surface 131 and the image-side surface 132 being both aspheric. Furthermore, both of the object-side surface 131 and the image-side surface 132 of the third lens element 130 have at least one inflection point.

The fourth lens element 140 with positive refractive power has an object-side surface 141 being convex in a paraxial region thereof and an image-side surface 142 being concave in a paraxial region thereof. The fourth lens element 140 is made of plastic material, and has the object-side surface 141 and the image-side surface 142 being both aspheric. Furthermore, both of the object-side surface 141 and the image-side surface 142 of the fourth lens element 140 have at least one inflection point.

The fifth lens element 150 with positive refractive power has an object-side surface 151 being concave in a paraxial region thereof and an image-side surface 152 being convex in a paraxial region thereof. The fifth lens element 150 is made of plastic material, and has the object-side surface 151 and the image-side surface 152 being both aspheric. Furthermore, the image-side surface 152 of the fifth lens element 150 has at least one inflection point.

The sixth lens element 160 with negative refractive power has an object-side surface 161 being concave in a paraxial region thereof and an image-side surface 162 being concave in a paraxial region thereof. The sixth lens element 160 is made of plastic material, and has the object-side surface 161 and the image-side surface 162 being both aspheric. Furthermore, the image-side surface 162 of the sixth lens element 160 includes at least one convex shape in an off-axial region thereof.

The IR-cut filter 170 is made of glass material and located between the sixth lens element 160 and the image surface 180, and will not affect a focal length of the optical photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly according to the 1st embodiment, when a focal length of the optical photographing lens assembly is f, an f-number of the optical photographing lens assembly is Fno, and half of a maximal field of view of the optical photographing lens assembly is HFOV, these parameters have the following values: f=6.61 mm; Fno=2.35; and HFOV=23.0 degrees.

Figure 13:
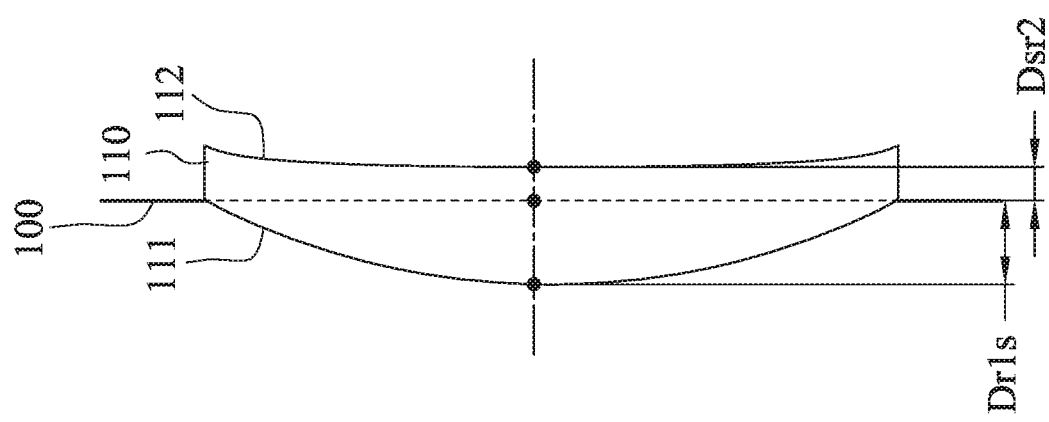
FIG. 13 shows a schematic view of the parameters Dr1s and Dsr2 of the first lens element of the optical photographing lens assembly in FIG. 1.

FIG. 13 shows a schematic view of the parameters Dr1s and Dsr2 of the first lens element 110 of the optical photographing lens assembly in FIG. 1. In FIG. 13, when an axial distance from the object-side surface 111 of the first lens element 110 to the aperture stop 100 is Dr1s, and an axial distance from the aperture stop 100 to the image-side surface 112 of the first lens element 110 is Dsr2, the following condition is satisfied: Dr1s/Dsr2=2.46.

In the optical photographing lens assembly according to the 1st embodiment, when a sum of axial distances between each two lens elements of the first lens element 110, the second lens element 120, the third lens element 130, the fourth lens element 140, the fifth lens element 150 and the sixth lens element 160 which are adjacent to each other is ΣAT, an axial distance between the first lens element 110 and the second lens element 120 is T12, and an axial distance between the second lens element 120 and the third lens element 130 is T23, the following condition is satisfied: ΣAT/(T12+T23)=5.52.

In the optical photographing lens assembly according to the 1st embodiment, when an axial distance between the aperture stop 100 and the image surface 180 is SL, and an axial distance between the object-side surface 111 of the first lens element 110 and the image surface 180 is TL, the following condition is satisfied: SL/TL=0.95.

In the optical photographing lens assembly according to the 1st embodiment, when the focal length of the optical photographing lens assembly is f, and a maximum image height of the optical photographing lens assembly is ImgH (half of a diagonal length of an effective photosensitive area of the image sensor 190), the following condition is satisfied: f/ImgH=2.25.

In the optical photographing lens assembly according to the 1st embodiment, when the focal length of the optical photographing lens assembly is f, and the axial distance between the object-side surface 111 of the first lens element 110 and the image surface 180 is TL, the following condition is satisfied: TL/f=1.04.

In the optical photographing lens assembly according to the 1st embodiment, when the focal length of the optical photographing lens assembly is f, and a curvature radius of the image-side surface 152 of the fifth lens element 150 is R10, the following condition is satisfied: R10/f=−0.61.

In the optical photographing lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, and an Abbe number of the sixth lens element 160 is V6, wherein at least two of the V1, V2, V3, V4, V5 and V6 are smaller than 27, and in the 1st embodiment, V2, V4 and V5 are smaller than 27.

The detailed optical data of the 1st embodiment are shown in Table 1 and the aspheric surface data are shown in Table 2 below.

TABLE 1

1st Embodiment f = 6.61 mm, Fno = 2.35, HFOV = 23.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.340 | | | | |
| 2 | Lens 1 | 3.330 | ASP | 0.478 | Plastic | 1.514 | 56.8 | 6.70 |
| 3 | | 98.781 | ASP | 0.125 | | | | |
| 4 | Lens 2 | 1.566 | ASP | 0.240 | Plastic | 1.639 | 23.5 | −6.19 |
| 5 | | 1.055 | ASP | 0.136 | | | | |
| 6 | Lens 3 | 3.106 | ASP | 0.931 | Plastic | 1.544 | 55.9 | 5.34 |
| 7 | | −40.867 | ASP | 0.151 | | | | |
| 8 | Lens 4 | 3.678 | ASP | 0.502 | Plastic | 1.639 | 23.5 | 24.21 |
| 9 | | 4.569 | ASP | 0.502 | | | | |
| 10 | Lens 5 | −3.999 | ASP | 0.482 | Plastic | 1.639 | 23.5 | 159.69 |
| 11 | | −4.029 | ASP | 0.528 | | | | |
| 12 | Lens 6 | −14.182 | ASP | 0.680 | Plastic | 1.535 | 55.7 | −6.31 |
| 13 | | 4.502 | ASP | 0.500 | | | | |

TABLE 1-continued

1st Embodiment f = 6.61 mm, Fno = 2.35, HFOV = 23.0 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 1.376 | | | | |
| 16 | image | Plano | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | 3.4923E+00 | −9.0000E+01 | −6.3774E+00 | −3.5499E+00 | 8.1821E−01 | 9.0000E+01 |
| A4 = | 3.0834E−02 | 2.6140E−02 | −1.6394E−01 | −1.3995E−01 | 3.3134E−02 | 4.9508E−02 |
| A6 = | −8.0200E−02 | −2.5567E−02 | 1.0936E−01 | 1.1578E−01 | −1.8676E−02 | 5.5933E−03 |
| A8 = | 8.8754E−02 | 2.5292E−02 | −3.5261E−02 | −4.3736E−02 | 2.9275E−02 | −2.7465E−02 |
| A10 = | −6.1718E−02 | −1.5997E−02 | 3.9652E−03 | 1.1105E−02 | −2.2565E−02 | 1.5461E−02 |
| A12 = | 2.1671E−02 | 5.0245E−03 | 1.7848E−03 | −2.7668E−03 | 7.6815E−03 | −4.9880E−03 |
| A14 = | −2.9876E−03 | −2.7579E−04 | −6.1482E−04 | 2.6249E−04 | −1.0763E−03 | 6.7912E−04 |

| Surface # | 8 | 9 | 10 | 11 | 12 | 13 |
|---|---|---|---|---|---|---|
| k = | −2.5971E+00 | −1.4832E+01 | 4.2223E−01 | −5.9107E+00 | 1.4384E+01 | −6.6561E+01 |
| A4 = | −1.4601E−02 | −4.3637E−02 | −4.6915E−03 | −2.1833E−03 | −1.6731E−01 | −5.3762E−02 |
| A6 = | 4.6484E−02 | 7.9441E−02 | 1.1363E−01 | 9.7161E−02 | 1.3640E−01 | 5.3248E−03 |
| A8 = | −5.9632E−02 | −8.9278E−02 | −1.5486E−01 | −8.6550E−02 | −1.4661E−01 | 2.8656E−03 |
| A10 = | 4.4888E−02 | 6.3478E−02 | 9.4633E−02 | 3.0844E−02 | 1.0615E−01 | −2.4947E−03 |
| A12 = | −1.7382E−02 | −2.3873E−02 | −3.8329E−02 | −8.0901E−03 | 4.8064E−02 | 6.5169E−04 |
| A14 = | 2.4484E−03 | 3.1987E−03 | 7.3400E−03 | 1.9784E−03 | 8.9165E−03 | −5.9390E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
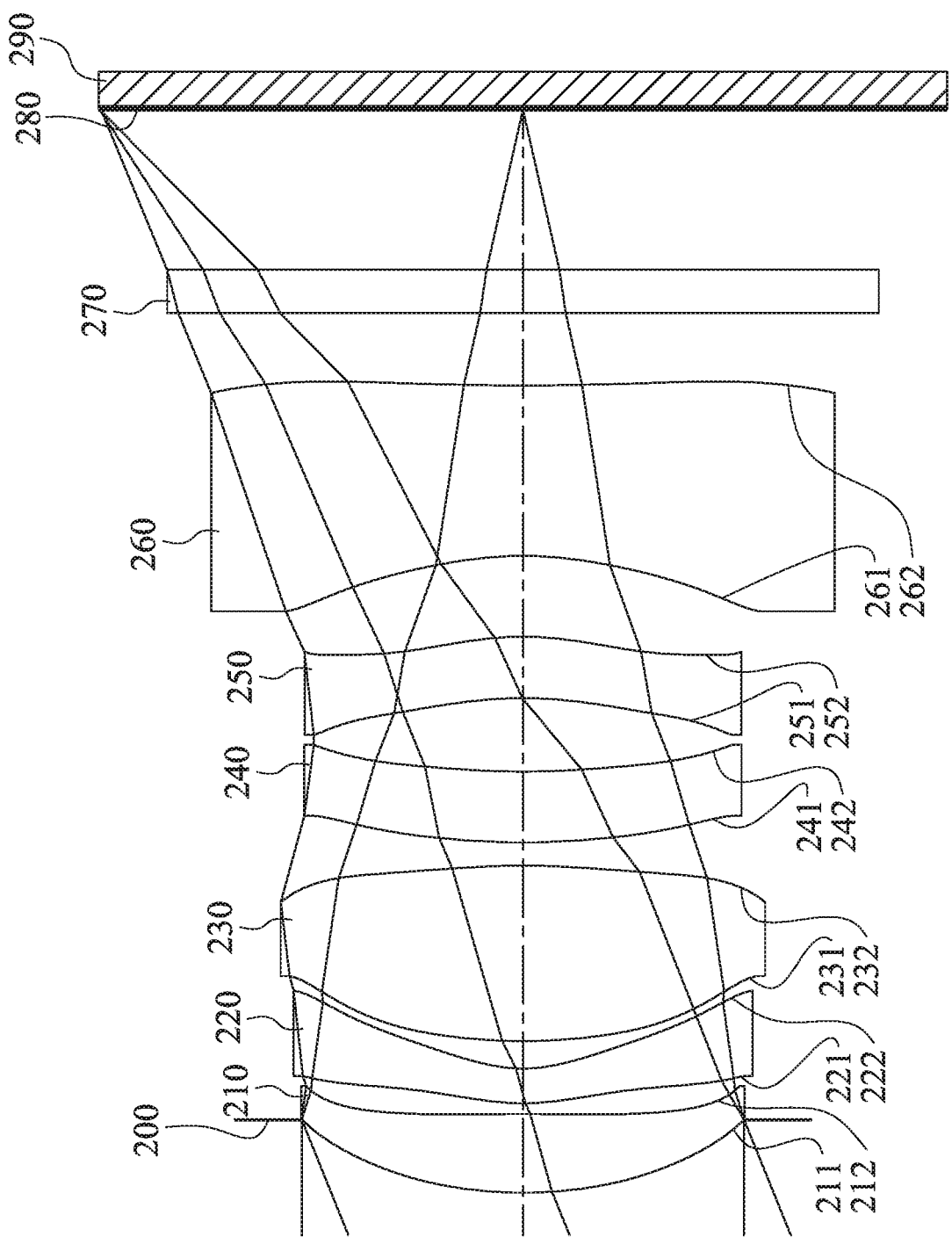
FIG. 3 is a schematic view of an image capturing device according to the 2nd embodiment of the present disclosure.
Figure 4:
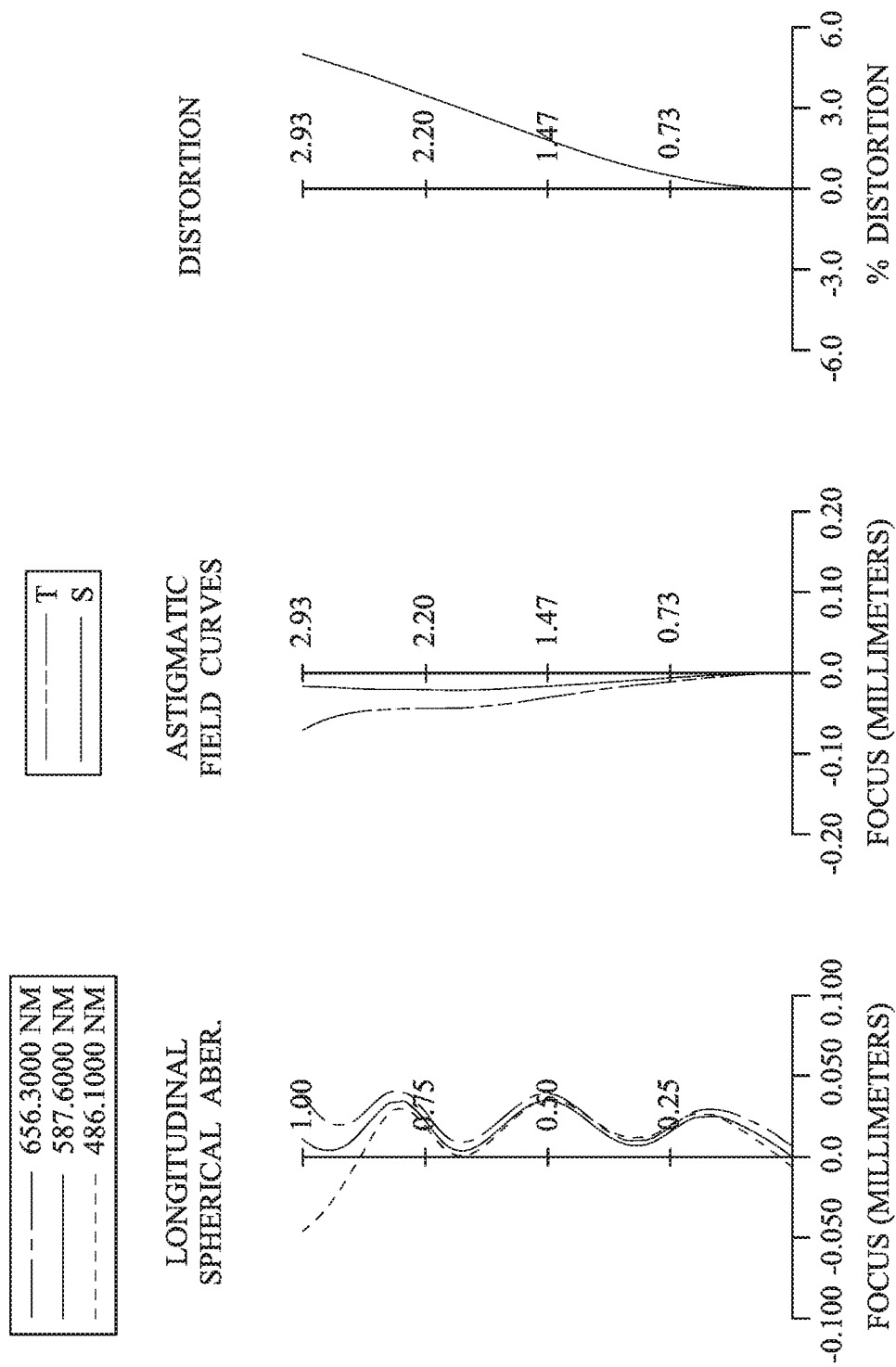
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an optical photographing lens assembly (its reference numeral is omitted) and an image sensor 290. The optical photographing lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280, wherein the image sensor 290 is disposed on the image surface 280 of the optical photographing lens assembly. The optical photographing lens assembly has a total of six lens elements (210-260) with refractive power. There is an air space in a paraxial region between any two of the first lens element 210, the second lens element 220, the third lens element 230, the fourth lens element 240, the fifth lens element 250, and the sixth lens element 260 that are adjacent to each other, and there is no relative movement among the lens elements (210-260) with refractive power.

The first lens element 210 with positive refractive power has an object-side surface 211 being convex in a paraxial region, thereof and an image-side surface 212 being convex in a paraxial region thereof. The first lens element 210 is made of plastic material, and has the object-side surface 211 and the image-side surface 212 being both aspheric. Furthermore, the image-side surface 212 of the first lens element 210 has at least one inflection point.

The second lens element 220 with negative refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric. Furthermore, both of the object-side surface 221 and the image-side surface 222 of the second lens element 220 have at least one inflection point.

The third lens element 230 with positive refractive power has an object-side surface 231 being convex in a paraxial region thereof and an image-side surface 232 being convex in a paraxial region thereof. The third lens element 230 is made of plastic material, and has the object-side surface 231 and the image-side surface 232 being both aspheric. Furthermore, both of the object-side surface 231 and the image-side surface 232 of the third lens element 230 have at least one inflection point.

The fourth lens element 240 with negative refractive power has an object-side surface 241 being convex in a paraxial region thereof and an image-side surface 242 being concave in a paraxial region thereof. The fourth lens element 240 is made of plastic material, and has the object-side surface 241 and the image-side surface 242 being both aspheric. Furthermore, the object-side surface 241 of the fourth lens element 240 has at least one inflection point.

The fifth lens element 250 with positive refractive power has an object-side surface 251 being concave in a paraxial region thereof and an image-side surface 252 being convex in a paraxial region thereof. The fifth lens element 250 is made of plastic material, and has the object-side surface 251 and the image-side surface 252 being both aspheric. Furthermore, both of the object-side surface 251 and the image-side surface 252 of the fifth lens element 250 have at least one inflection point.

The sixth lens element 260 with negative refractive power has an object-side surface 261 being concave in a paraxial region thereof and an image-side surface 262 being concave in a paraxial region thereof. The sixth lens element 260 is made of plastic material, and has the object-side surface 261 and the image-side surface 262 being both aspheric. Furthermore, the image-side surface 262 of the sixth lens element 260 includes at least one convex shape in an off-axial region thereof.

The IR-cut filter 270 is made of glass material and located between the sixth lens element 260 and the image surface 280, and will not affect a focal length of the optical photographing lens assembly.

The detailed optical data of the 2nd embodiment are shown in Table 3 and the aspheric surface data are shown in Table 4 below.

TABLE 3

2nd Embodiment $f = 6.89$ mm, Fno = 2.26, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.505 | | | | |
| 2 | Lens 1 | 3.199 | ASP | 0.545 | Plastic | 1.514 | 56.8 | 5.43 |
| 3 | | −20.490 | ASP | 0.074 | | | | |
| 4 | Lens 2 | 1.640 | ASP | 0.240 | Plastic | 1.607 | 26.6 | −4.97 |
| 5 | | 1.004 | ASP | 0.191 | | | | |
| 6 | Lens 3 | 4.200 | ASP | 1.214 | Plastic | 1.535 | 55.7 | 4.63 |
| 7 | | −5.432 | ASP | 0.161 | | | | |
| 8 | Lens 4 | 5.371 | ASP | 0.490 | Plastic | 1.633 | 23.4 | −230.11 |
| 9 | | 4.997 | ASP | 0.509 | | | | |
| 10 | Lens 5 | −2.984 | ASP | 0.425 | Plastic | 1.544 | 55.9 | 13.33 |
| 11 | | −2.220 | ASP | 0.560 | | | | |
| 12 | Lens 6 | −2.561 | ASP | 1.180 | Plastic | 1.514 | 56.8 | −4.45 |
| 13 | | 24.486 | ASP | 0.500 | | | | |
| 14 | IR-cut filter | Plano | | 0.300 | Glass | 1.517 | 64.2 | — |
| 15 | | Plano | | 1.119 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 2.8239E+00 | 8.9147E+01 | −1.1224E+01 | −4.4175E+00 | −6.1594E+00 | 8.1794E+00 |
| A4 = | 3.8374E−02 | 5.7482E−02 | −1.4842E−01 | −1.3192E−01 | 2.4180E−02 | 5.2719E−02 |
| A6 = | −7.8277E−02 | −2.8601E−02 | 1.0371E−01 | 1.1926E−01 | −4.0176E−03 | 6.0477E−03 |
| A8 = | 9.0692E−02 | 2.3072E−02 | −3.5240E−02 | −4.3925E−02 | 3.0114E−02 | −2.6143E−02 |
| A10 = | −6.1960E−02 | −1.4594E−02 | 4.1020E−03 | 1.1435E−02 | −2.3491E−02 | 1.5857E−02 |
| A12 = | 2.1337E−02 | 5.5530E−03 | 1.8738E−03 | −2.6553E−03 | 7.4319E−03 | −4.9628E−03 |
| A14 = | −2.9015E−03 | −6.1040E−04 | −5.4547E−04 | 2.2512E−04 | −9.8502E−04 | 6.3149E−04 |

| Surface # | 8 | 9 | 10 | 11 | 12 | 13 |
|---|---|---|---|---|---|---|
| k = | −4.7768E+00 | −6.0097E+00 | −1.9238E+00 | −4.3382E+00 | 1.1359E+00 | −6.6561E+01 |
| A4 = | −1.9463E−02 | −7.4264E−02 | 3.6451E−03 | 4.9927E−02 | 7.6160E−02 | 7.3668E−03 |
| A6 = | 5.0089E−02 | 8.4701E−02 | 1.2116E−01 | 8.6713E−02 | −2.4190E−02 | −8.8608E−03 |
| A8 = | −6.0299E−02 | −7.4656E−02 | −1.4981E−01 | −8.6257E−02 | −1.8063E−02 | 2.5654E−03 |
| A10 = | 4.5370E−02 | 5.9696E−02 | 9.6649E−02 | 3.3712E−02 | 6.9843E−03 | −4.4452E−04 |
| A12 = | −1.7351E−02 | −2.5217E−02 | −3.8377E−02 | −8.1780E−03 | −3.1180E−03 | 4.4498E−05 |
| A14 = | 2.3872E−03 | 3.9672E−03 | 6.6552E−03 | 1.2685E−03 | 5.9370E−04 | −1.8784E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.89 | SL/TL | 0.93 |
| Fno | 2.25 | f/ImgH | 2.35 |
| HFOV [deg.] | 22.0 | TL/f | 1.09 |
| Dr1s/Dsr2 | 12.63 | R10/f | −0.32 |
| ΣAT/(T12 + T23) | 5.64 | | |

Moreover, in the optical photographing lens assembly according to the 2nd embodiment, when an Abbe number of the first lens element 210 is V1, an Abbe number of the second lens element 220 is V2, an Abbe number of the third lens element 230 is V3, an Abbe number of the fourth lens element 240 is V4, an Abbe number of the fifth lens element 250 is V5, and an Abbe number of the sixth lens element 260 is V6, wherein at least two of the V1, V2, V3, V4, V5 and V6 are smaller than 27, and in the 2nd embodiment, V2 and V4 are smaller than 27.

3rd Embodiment

Figure 5:
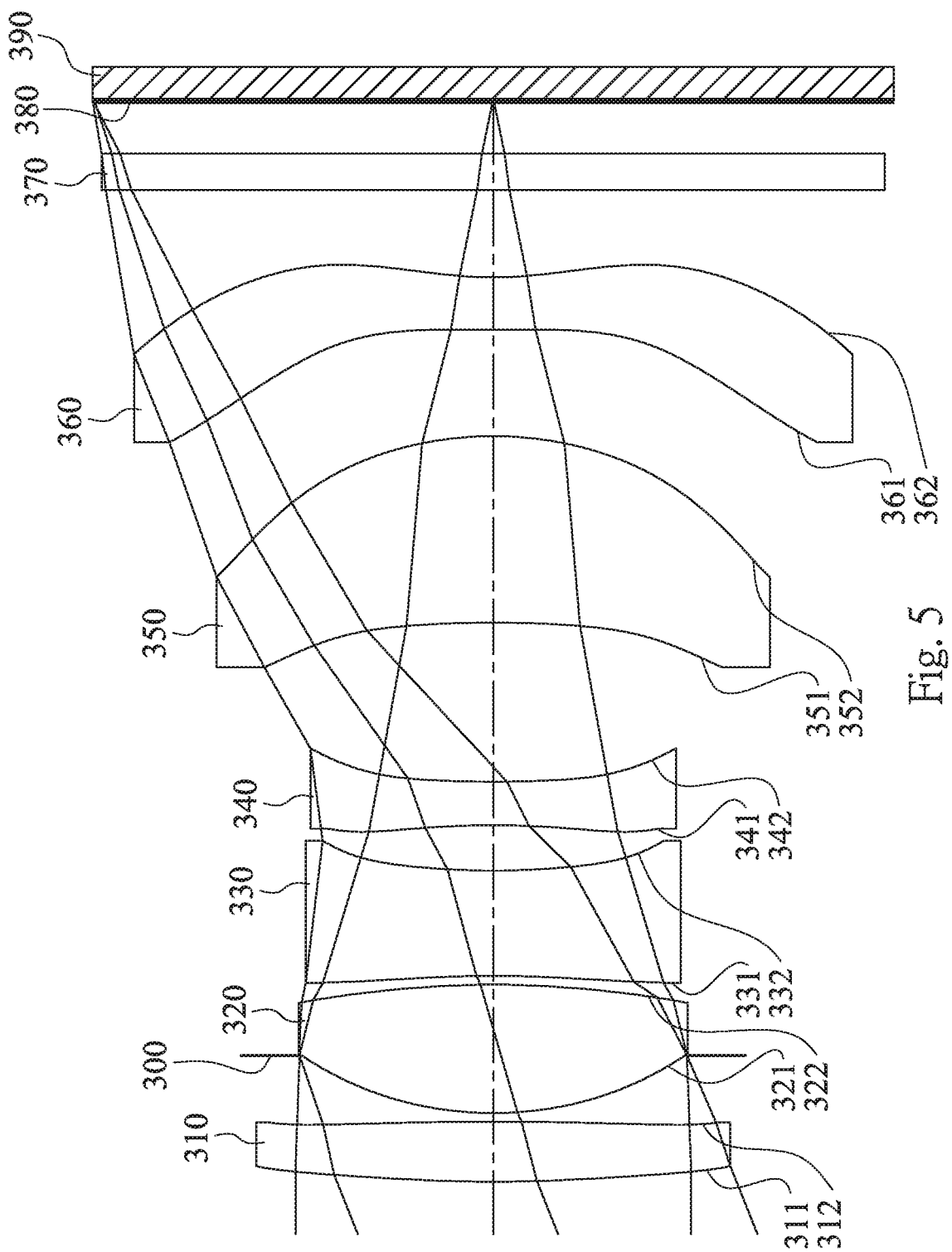
FIG. 5 is a schematic view of an image capturing device according to the 3rd embodiment of the present disclosure.
Figure 6:
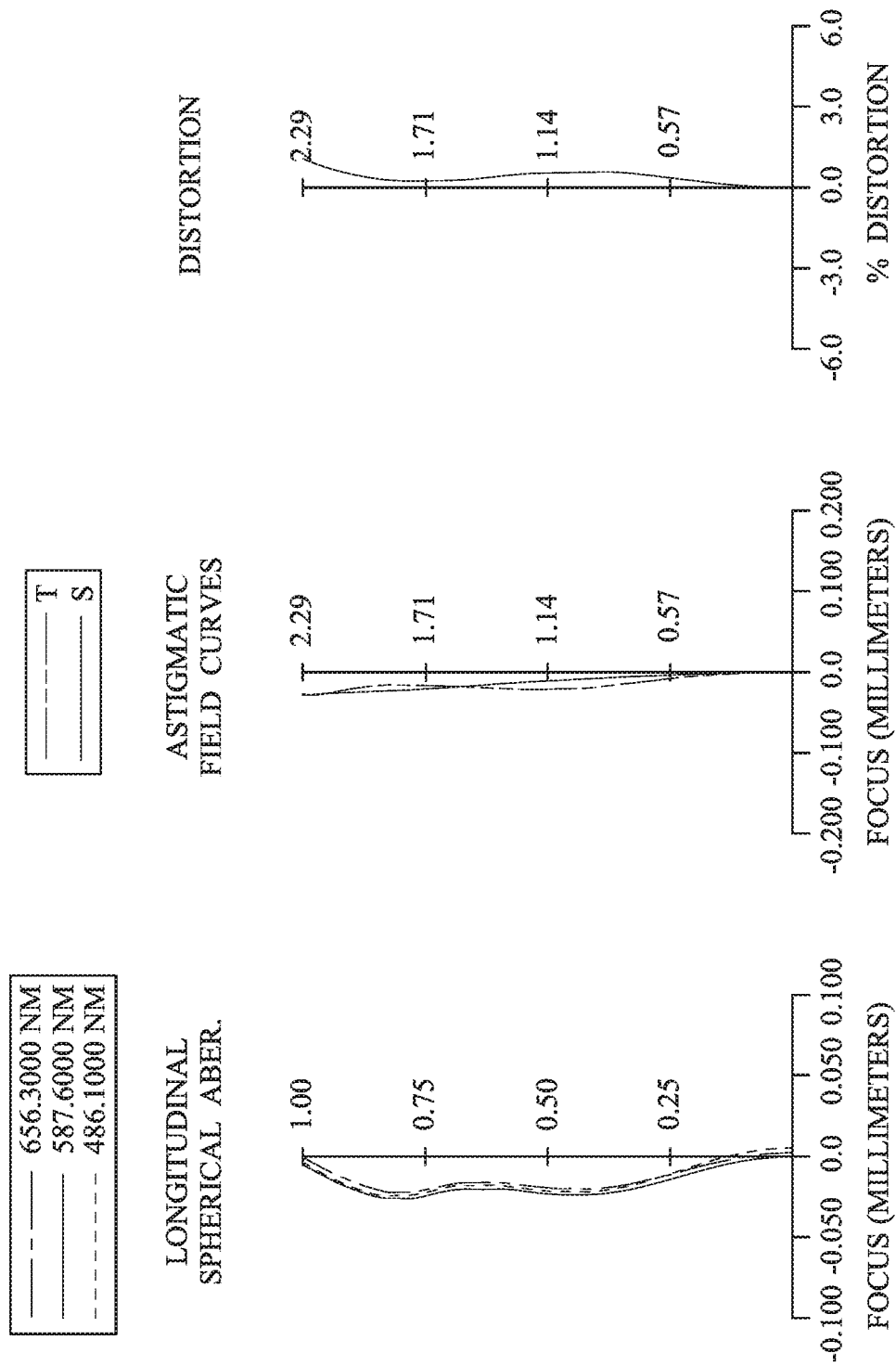
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an optical photographing lens assembly (its reference numeral is omitted) and an image sensor 390. The optical photographing lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the optical photographing lens assembly. The optical photographing lens assembly has a total of six lens elements (310-360) with refractive power. There is an air space in a paraxial region between any two of the first lens element 310, the second lens element 320, the third lens element 330, the fourth lens element 340, the fifth lens element 350, and the sixth lens element 360 that are adjacent to each other, and there is no relative movement among the lens elements (310-360) with refractive power.

The first lens element 310 with positive refractive power has an object-side surface 311 being convex in a paraxial region thereof and an image-side surface 312 being convex in a paraxial region thereof. The first lens element 310 is made of plastic material, and has the object-side surface 311 and the image-side surface 312 being both aspheric. Furthermore, the image-side surface 312 of the first lens element 310 has at least one inflection point.

The second lens element 320 with positive refractive power has an object-side surface 321 being convex in a paraxial region thereof and an image-side surface 322 being convex in a paraxial region thereof. The second lens element 320 is made of plastic material, and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material, and has the object-side surface 331 and the image-side surface 332 being both aspheric. Furthermore, both of the object-side surface 331 and the image-side surface 332 of the third lens element 330 have at least one inflection point.

The fourth lens element 340 with negative refractive power has an object-side surface 341 being concave in a paraxial region thereof and an image-side surface 342 being concave in a paraxial region thereof. The fourth lens element 340 is made of plastic material, and has the object-side surface 341 and the image-side surface 342 being both aspheric. Furthermore, both of the object-side surface 341 and the image-side surface 342 of the fourth lens element 340 have at least one inflection point.

The fifth lens element 350 with positive refractive power has an object-side surface 351 being concave in a paraxial region thereof and an image-side surface 352 being convex in a paraxial region thereof. The fifth lens element 350 is made of plastic material, and has the object-side surface 351 and the image-side surface 352 being both aspheric. Furthermore, both of the object-side surface 351 and the image-side surface. 352 of the fifth lens element 350 have at least one inflection point.

The sixth len element 360 with negative refractive power has an object-side surface 361 being convex in a paraxial region thereof and an image-side surface 362 being concave in a paraxial region thereof. The sixth lens element 360 is made of plastic material, and has the object-side surface 361 and the image-side surface 362 being both aspheric. Furthermore, the image-side surface 362 of the sixth lens element 360 includes at least one convex shape in an off-axial region thereof.

The IR-cut filter 370 is made of glass material and located between the sixth lens element 360 and the image surface 380, and will not affect a focal length of the optical photographing lens assembly.

The detailed optical data of the 3rd embodiment are shown in Table 5 and the aspheric surface data are shown in Table 6 below.

TABLE 5

3rd Embodiment f = 5.67 mm, Fno = 2.50, HFOV = 21.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.974 | ASP | 0.344 | Plastic | 1.544 | 55.9 | 11.41 |
| 2 | | −27.592 | ASP | 0.380 | | | | |
| 3 | Ape. Stop | Plano | | −0.330 | | | | |
| 4 | Lens 2 | 2.107 | ASP | 0.737 | Plastic | 1.544 | 55.9 | 2.87 |

TABLE 5-continued

3rd Embodiment f = 5.67 mm, Fno = 2.50, HFOV = 21.8 deg.

| Surface # | | Curvature Radius | Thickness | | Material | Index | Abbe # | Focal Length |
|---|---|---|---|---|---|---|---|---|
| 5 | | −5.262 | ASP | 0.050 | | | | |
| 6 | Lens 3 | −6.617 | ASP | 0.604 | Plastic | 1.639 | 23.5 | −4.23 |
| 7 | | 4.726 | ASP | 0.261 | | | | |
| 8 | Lens 4 | −4.599 | ASP | 0.250 | Plastic | 1.544 | 55.9 | −5.71 |
| 9 | | 9.785 | ASP | 0.912 | | | | |
| 10 | Lens 5 | −7.411 | ASP | 1.070 | Plastic | 1.544 | 55.9 | 4.89 |
| 11 | | −2.059 | ASP | 0.611 | | | | |
| 12 | Lens 6 | 29.111 | ASP | 0.300 | Plastic | 1.544 | 55.9 | −4.36 |
| 13 | | 2.187 | ASP | 0.500 | | | | |
| 14 | IR-cut filter | Plano | | 0.210 | Glass | 1.517 | 64.2 | — |
| 15 | | Plano | | 0.301 | | | | |
| 16 | Image | Plano | | — | | | | |

Note:
Reference wavelength is 587.6 nm (d-line).

TABLE 6

Aspheric Coefficients

| Surface # | 1 | 2 | 4 | 5 | 6 | 7 |
|---|---|---|---|---|---|---|
| k = | −7.9010E+01 | 9.1739E−01 | −1.4014E−01 | 1.3679E+01 | −6.9708E+01 | 2.1230E+00 |
| A4 = | −6.9006E−03 | −8.0306E−03 | 2.0317E−02 | 6.9432E−02 | 4.5340E−02 | 4.3292E−03 |
| A6 = | −1.0269E−04 | 7.3759E−03 | 5.9327E−03 | −1.5595E−01 | −1.6152E−01 | 6.0184E−02 |
| A8 = | 2.3250E−03 | 5.9120E−04 | −2.0822E−02 | 2.3155E−01 | 3.0045E−01 | −1.9558E−01 |
| A10 = | 2.5859E−04 | 5.0612E−04 | 1.8982E−02 | −1.5381E−01 | −2.2475E−01 | 5.0799E−01 |
| A12 = | −5.5756E−05 | 2.3478E−04 | −6.3485E−03 | 3.7747E−02 | 5.9297E−02 | −3.0524E−01 |

| Surface # | 8 | 9 | 10 | 11 | 12 | 13 |
|---|---|---|---|---|---|---|
| k = | 1.9204E+01 | 7.7817E+01 | 2.8897E+01 | −7.2997E−01 | 5.2877E+01 | −3.5067E−01 |
| A4 = | 8.2676E−02 | 9.6455E−02 | −1.7245E−02 | −5.6433E−04 | −1.9217E−01 | −2.4131E−01 |
| A6 = | −2.4804E−02 | −1.3812E−02 | −3.4418E−02 | −4.3030E−02 | 3.6571E−02 | 9.6363E−02 |
| A8 = | 4.0809E−02 | −9.0362E−03 | 1.1080E−02 | 2.5351E−02 | 1.4000E−02 | −3.2234E−02 |
| A10 = | 2.5453E−01 | 1.1899E−01 | −3.0037E−03 | −9.0950E−03 | −6.2321E−03 | 7.8495E−03 |
| A12 = | −1.9722E−01 | −9.7470E−02 | 4.0209E−03 | 1.6533E−03 | 6.7530E−04 | −1.1766E−03 |
| A14 = | | | | | | 7.6075E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.67 | SL/TL | 0.88 |
| Fno | 2.50 | f/ImgH | 2.48 |
| HFOV [deg.] | 21.8 | TL/f | 1.09 |
| Dr1s/Dsr2 | −1.91 | R10/f | −0.36 |
| ΣAT/(T12 + T23) | 18.84 | | |

4th Embodiment

Figure 7:
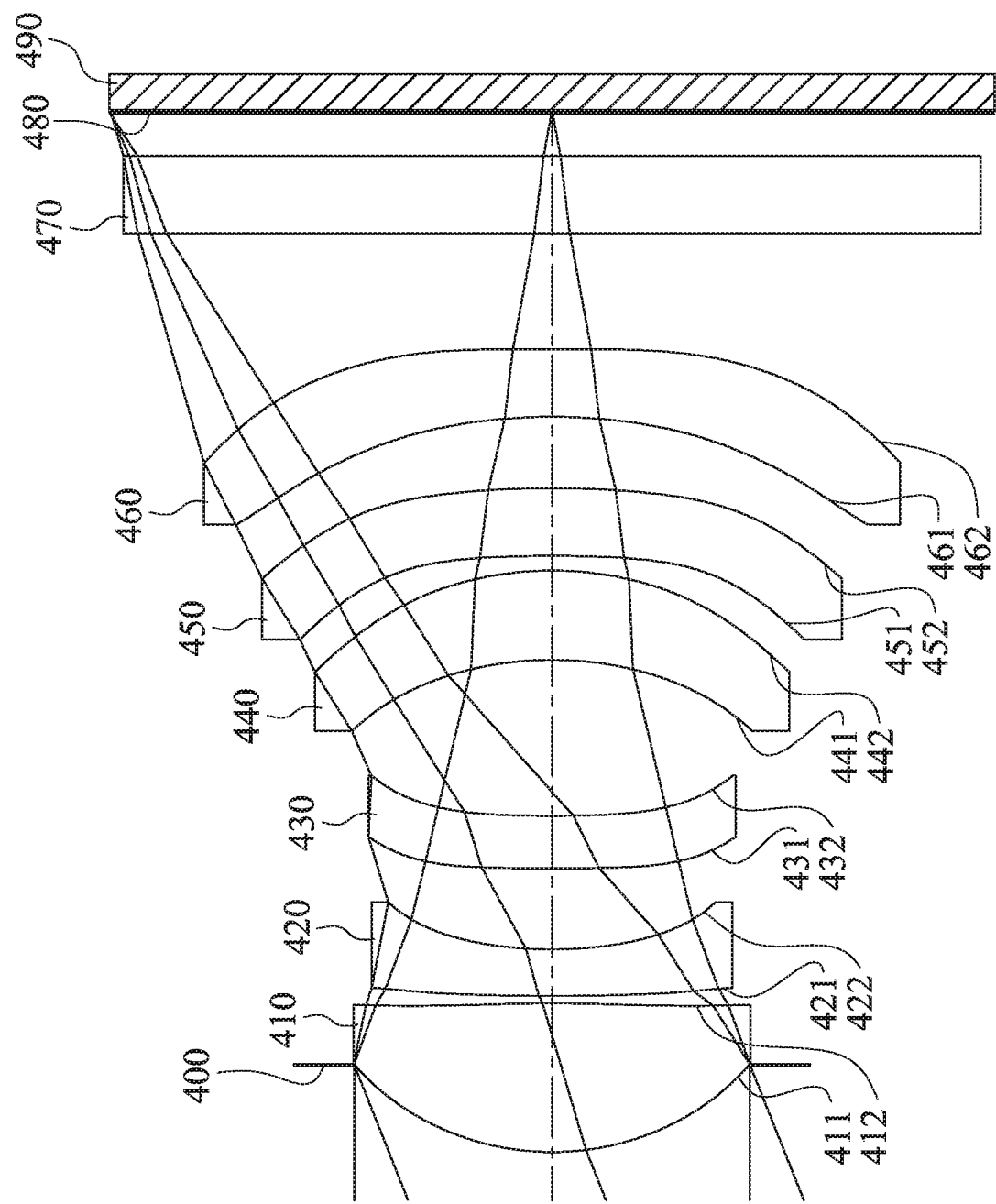
FIG. 7 is a schematic view of an image capturing device according to the 4th embodiment of the present disclosure.
Figure 8:
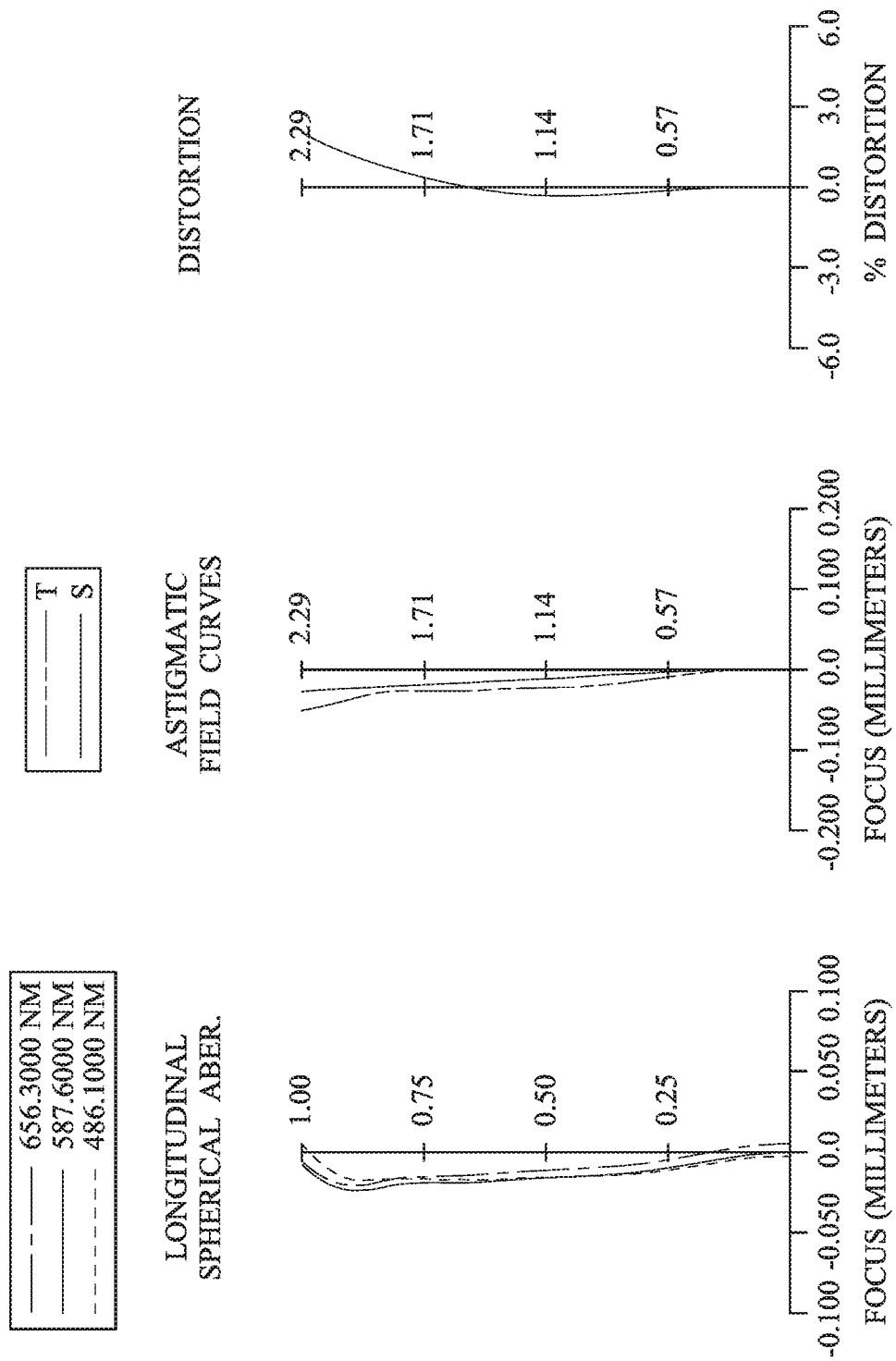
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an optical photographing lens assembly (its reference numeral is omitted) and an image sensor 490. The optical photographing lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein the image sensor 490 is disposed on the image surface 480 of the optical photographing lens assembly. The optical photographing lens assembly has a total of six lens elements (410-460) with refractive power. There is an air space in a paraxial region between any two of the first lens element 410, the second lens element 420, the third lens element 430, the fourth lens element 440, the fifth lens element 450, and the sixth lens element 460 that are adjacent to each other, and there is no relative movement among the lens elements (410-460) with refractive power.

The first lens element 410 with positive refractive power has an object-side surface 411 being convex in a paraxial region thereof and an image-side surface 412 being convex in a paraxial region thereof. The first lens element 410 is made of plastic material, and has the object-side surface 411 and the image-side surface 412 being both aspheric. Furthermore, the image-side surface 412 of the first lens element 410 has at least one inflection point.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric. Furthermore, the object-side surface 421 of the second lens element 420 has at least one inflection point.

The third lens element 430 with negative refractive power has an object-side surface 431 being convex in a paraxial region thereof and an image-side surface 432 being concave in a paraxial region thereof. The third lens element 430 is made of plastic material, and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material, and has the object-side surface 441 and the image-side surface 442 being both aspheric. Furthermore, the image-side surface 442 of the fourth lens element 440 has at least one inflection point.

The fifth lens element 450 with positive refractive power has an object-side surface 451 being concave in a paraxial region thereof and an image-side surface 452 being convex in a paraxial region thereof. The fifth lens element 450 is made of plastic material, and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of plastic material, and has the object-side surface 461 and the image-side surface 462 being both aspheric. Furthermore, the image-side surface 462 of the sixth lens element 460 includes at least one convex shape in an off-axial region thereof.

The IR-cut filter 470 is made of glass material and located between the sixth lens element 460 and the image surface 480, and will not affect a focal length of the optical photographing lens assembly.

The detailed optical data of the 4th embodiment are shown in Table 7 and the aspheric surface data are shown in Table 8 below.

TABLE 7

4th Embodiment f = 5.64 mm, Fno = 2.76, HFOV = 21.7 deg.

| Surface # | | Curvature Radius | Thickness | | Material | Index | Abbe # | Focal Length |
|---|---|---|---|---|---|---|---|---|
| 0 | Object | Plano | Infinity | | | | | |
| 1 | Ape. Stop | Plano | −0.451 | | | | | |
| 2 | Lens 1 | 1.415 | ASP | 0.768 | Plastic | 1.544 | 55.9 | 2.35 |
| 3 | | −10.702 | ASP | 0.039 | | | | |
| 4 | Lens 2 | 10.138 | ASP | 0.240 | Plastic | 1.639 | 23.5 | −4.06 |
| 5 | | 2.047 | ASP | 0.420 | | | | |
| 6 | Lens 3 | 22.160 | ASP | 0.270 | Plastic | 1.544 | 55.9 | −16.79 |
| 7 | | 6.440 | ASP | 0.808 | | | | |
| 8 | Lens 4 | −1.820 | ASP | 0.462 | Plastic | 1.639 | 23.5 | 31.60 |
| 9 | | −1.835 | ASP | 0.076 | | | | |
| 10 | Lens 5 | −7.890 | ASP | 0.350 | Plastic | 1.530 | 55.8 | 26.68 |
| 11 | | −5.142 | ASP | 0.368 | | | | |
| 12 | Lens 6 | −3.381 | ASP | 0.350 | Plastic | 1.544 | 55.9 | −5.96 |
| 13 | | 80.989 | ASP | 0.600 | | | | |
| 14 | IR-cut filter | Plano | | 0.400 | Glass | 1.517 | 64.2 | — |
| 15 | | Plano | | 0.227 | | | | |
| 16 | image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −1.5073E−01 | 1.9375E+01 | −4.9081E+01 | −5.1300E−01 | 2.5942E+01 | 8.5348E+00 |
| A4 = | 1.4642E−02 | 1.0740E−02 | −9.2295E−02 | −5.4122E−02 | 1.0154E−01 | 1.1837E−01 |
| A6 = | −6.7770E−03 | 1.5971E−01 | 3.7743E−01 | 3.8940E−01 | 9.0921E−02 | 1.0854E−01 |
| A8 = | 3.4777E−02 | −3.2804E−01 | −6.5307E−01 | −5.2162E−01 | 1.2872E−02 | −1.6226E−01 |
| A10 = | −3.6521E−02 | 3.4322E−01 | 6.7728E−01 | 8.0347E−01 | 4.4461E−02 | 3.1892E−01 |
| A12 = | 2.0143E−02 | −1.4485E−01 | −3.1982E−01 | −4.6100E−01 | −7.9466E−02 | −2.0711E−01 |

| Surface # | 8 | 9 | 10 | 11 | 12 | 13 |
|---|---|---|---|---|---|---|
| k = | 0.0000E+00 | 0.0000E+00 | 3.0885E+01 | −1.1230E+01 | −1.1827E+01 | −4.4060E+01 |
| A4 = | −2.1207E−03 | −3.6662E−02 | −8.5730E−02 | 6.7516E−05 | −1.1807E−01 | −1.4347E−01 |
| A6 = | −3.3690E−02 | 2.0063E−03 | −3.5880E−02 | −6.9422E−02 | 8.6359E−02 | 8.2253E−02 |

TABLE 8-continued

Aspheric Coefficients

| A8 =  | −8.0584E−03 | 9.3315E−04  | −8.3046E−03 | 1.7778E−02  | −4.6432E−02 | −3.6962E−02 |
| A10 = | 8.1617E−03  | −2.6258E−04 | 2.4120E−02  | 4.7569E−03  | 1.2504E−02  | 1.0430E−02  |
| A12 = | 5.8784E−03  | 2.8218E−04  | −5.1175E−03 | −1.7338E−03 | −1.1675E−03 | −1.9011E−03 |
| A14 = | −8.4192E−03 | 8.5362E−04  |             |             |             | 1.7305E−04  |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.64 | SL/TL | 0.92 |
| Fno | 2.76 | f/ImgH | 2.47 |
| HFOV [deg.] | 21.7 | TL/f | 0.95 |
| Dr1s/Dsr2 | 1.42 | R10/f | −0.91 |
| ΣAT/(T12 + T23) | 3.73 | | |

Moreover, in the optical photographing lens assembly according to the 4th embodiment, when an Abbe number of the first lens element 410 is V1, an Abbe number of the second lens element 420 is V2, an Abbe number of the third lens element 430 is V3, an Abbe number of the fourth lens element 440 is V4, an Abbe number of the fifth lens element 450 is V5, and an Abbe number of the sixth lens element 460 is V6, wherein at least two of the V1, V2, V3, V4, V5 and V6 are smaller than 27, and in the 4th embodiment, V2 and V4 are smaller than 27.

5th Embodiment

Figure 9:
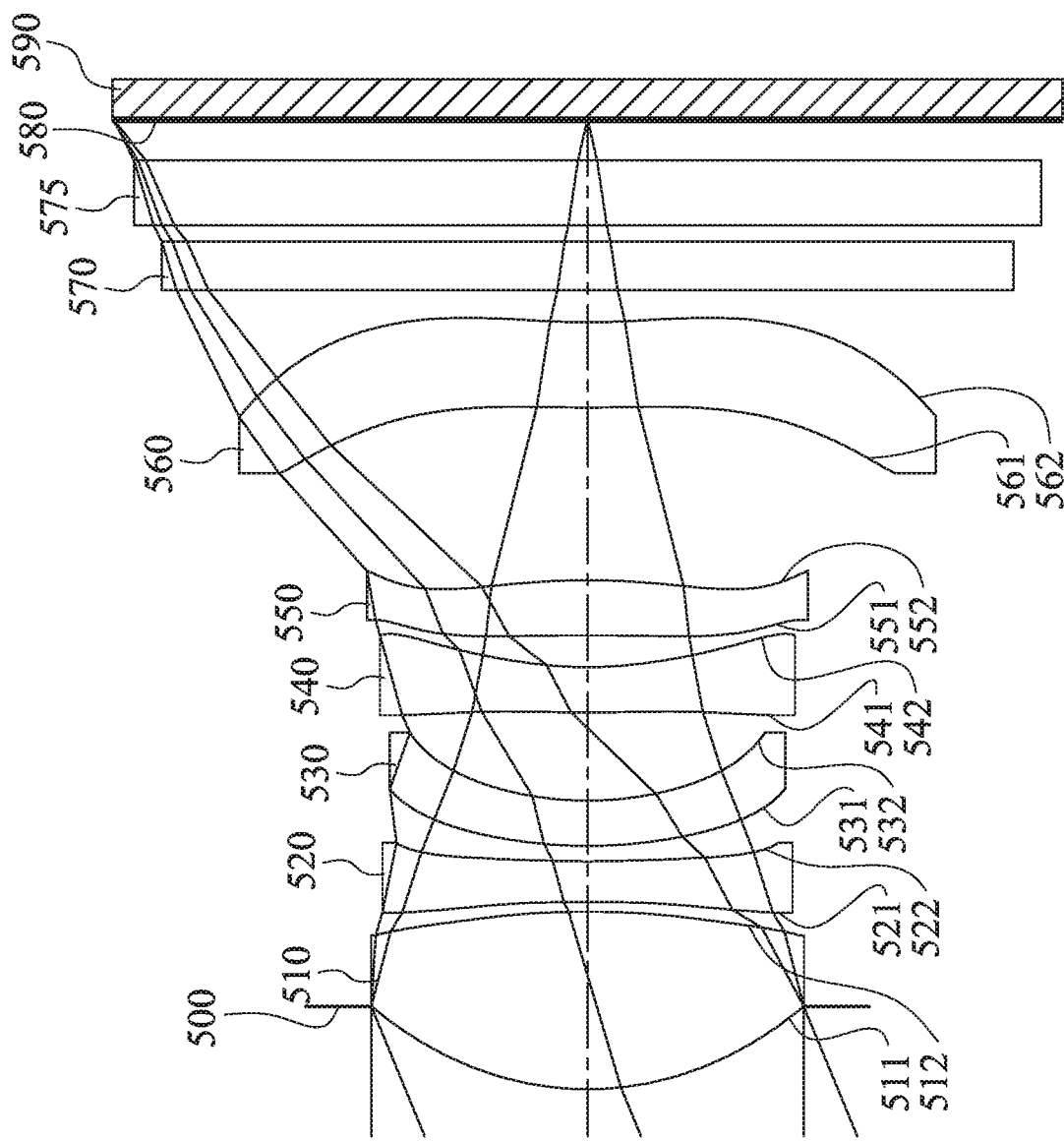
FIG. 9 is a schematic view of an image capturing device according to the 5th embodiment of the present disclosure.
Figure 10:
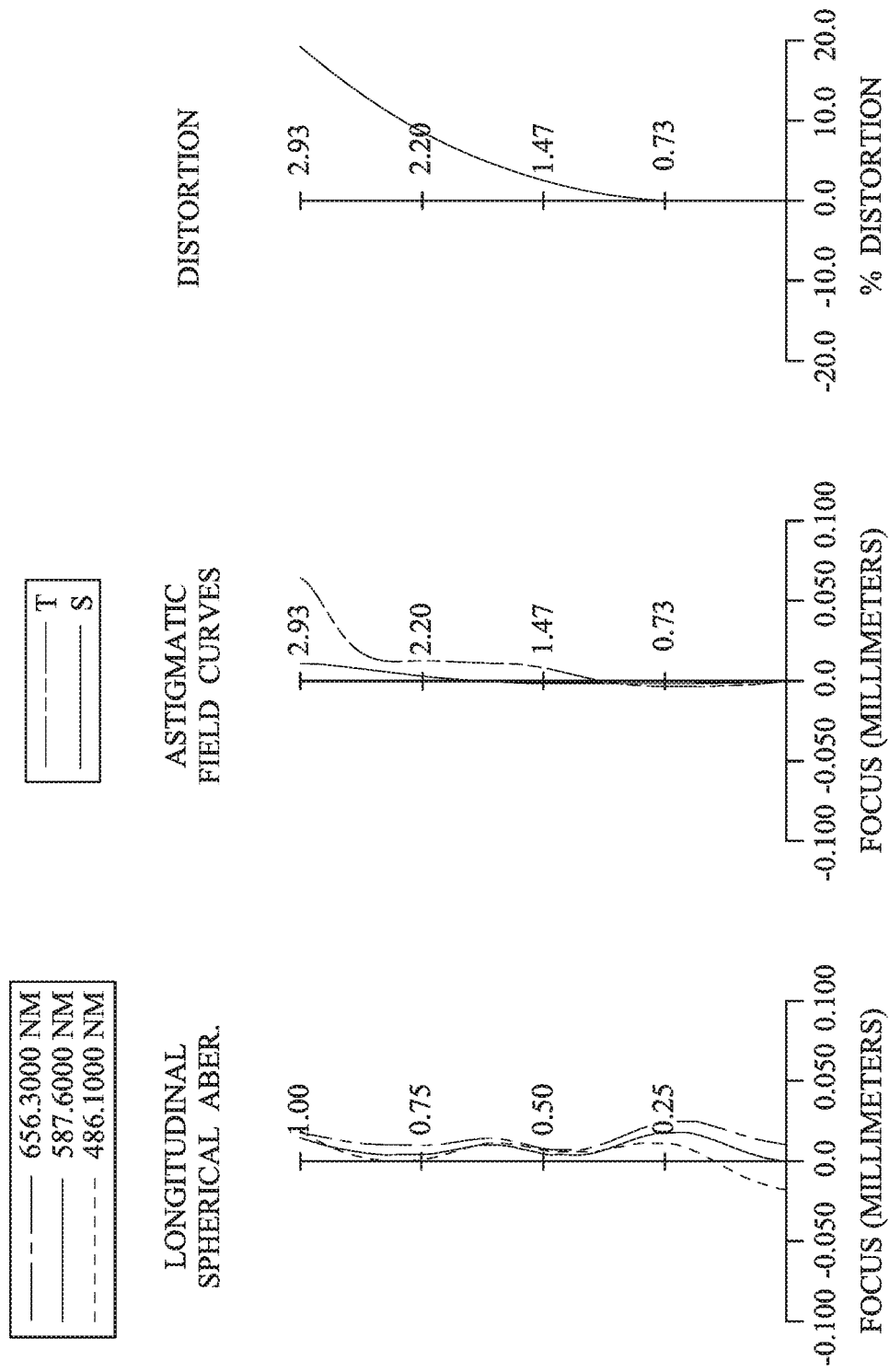
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an optical photographing lens assembly (its reference numeral is omitted) and an image sensor 590. The optical photographing lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570, a cover glass 575 and an image surface 580, wherein the image sensor 590 is disposed on the image surface 580 of the optical photographing lens assembly. The optical photographing lens assembly has a total of six lens elements (510-660) with refractive power. There is an air space in a paraxial region between any two of the first lens element 510, the second lens element 520, the third lens element 530, the fourth lens element 540, the fifth lens element 550, and the sixth lens element 560 that are adjacent to each other, and there is no relative movement among the lens elements (510-560) with refractive power.

The first lens element 510 with positive refractive power has an object-side surface 511 being convex in a paraxial region thereof and an image-side surface 512 being convex in a paraxial region thereof. The first lens element 510 is made of plastic material, and has the object-side surface 511 and the image-side surface 512 being both aspheric. Furthermore, the object-side surface 511 of the first lens element 510 has at least one inflection point.

The second lens element 520 with negative refractive power has an object-side surface 521 being concave in a paraxial region thereof and an image-side surface 522 being concave in a paraxial region thereof. The second lens element 520 is made of plastic material, and has the object-side surface 521 and the image-side surface 522 being both aspheric. Furthermore, the object-side surface 521 of the second lens element 520 has at least one inflection point.

The third lens element 530 with negative refractive power has an object-side surface 531 being convex in a paraxial region thereof and an image-side surface 532 being concave in a paraxial region thereof. The third lens element 530 is made of plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material, and has the object-side surface 541 and the image-side surface 542 being both aspheric. Furthermore, the object-side surface 541 of the fourth lens element 540 has at least one inflection point.

The fifth lens element 550 with positive refractive power has an object-side surface 551 being concave in a paraxial region thereof and an image-side surface 552 being convex in a paraxial region thereof. The fifth lens element 550 is made of plastic material, and has the object-side surface 551 and the image-side surface 552 being both aspheric. Furthermore, both of the object-side surface 551 and the image-side surface 552 of the fifth lens element 550 have at least one inflection point.

The sixth lens element 560 with negative refractive power has an object-side surface 561 being convex in a paraxial region thereof and an image-side surface 562 being concave in a paraxial region thereof. The sixth lens element 560 is made of plastic material, and has the object-side surface 561 and the image-side surface 562 being both aspheric. Furthermore, the image-side surface 562 of the sixth lens element 560 includes at least one convex shape in an off-axial region thereof.

The IR-cut filter 570 and the cover glass 575 are made of glass material and located between the sixth lens element 560 and the image surface 580 in order, and will not affect a focal length of the optical photographing lens assembly.

The detailed optical data of the 5th embodiment are shown in Table 9 and the aspheric surface data are shown in Table 10 below.

TABLE 9

5th Embodiment f = 5.96 mm, Fno = 2.23, HFOV = 22.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.511 | | | | |
| 2 | Lens 1 | 1.936 | ASP | 1.097 | Plastic | 1.544 | 55.9 | 2.92 |
| 3 | | −7.093 | ASP | 0.061 | | | | |
| 4 | Lens 2 | −29.566 | ASP | 0.250 | Plastic | 1.650 | 21.5 | −8.73 |
| 5 | | 7.051 | ASP | 0.095 | | | | |
| 6 | Lens 3 | 2.897 | ASP | 0.280 | Plastic | 1.650 | 21.5 | −12.11 |
| 7 | | 2.037 | ASP | 0.545 | | | | |
| 8 | Lens 4 | 9.246 | ASP | 0.280 | Plastic | 1.544 | 55.9 | −5.86 |
| 9 | | 2.345 | ASP | 0.197 | | | | |
| 10 | Lens 5 | −23.104 | ASP | 0.340 | Plastic | 1.650 | 21.5 | 9.20 |
| 11 | | −4.781 | ASP | 1.067 | | | | |
| 12 | Lens 6 | 8.557 | ASP | 0.527 | Plastic | 1.650 | 21.5 | −11.09 |
| 13 | | 3.819 | ASP | 0.200 | | | | |
| 14 | IR-cut filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 0.252 | | | | |
| 18 | Image | Plano | | — | | | | |

Note:
Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | 3.7947E−01 | 2.4820E+01 | −9.0000E+01 | 3.2091E+01 | −1.3375E+00 | −1.1365E+00 |
| A4 = | −1.2114E−02 | −1.7976E−01 | −2.9206E−01 | −1.4260E−01 | −5.7876E−03 | 4.7289E−03 |
| A6 = | 1.8000E−02 | 5.2403E−01 | 7.3508E−01 | 2.6526E−01 | −1.8637E−03 | 2.7692E−02 |
| A8 = | −5.4637E−02 | −7.3021E−01 | −1.0227E+00 | −3.2086E−01 | 2.0456E−02 | 2.6736E−02 |
| A10 = | 7.2232E−02 | 6.2503E−01 | 8.8822E−01 | 2.2392E−01 | 3.9322E−03 | 5.4937E−03 |
| A12 = | −5.3347E−02 | −3.2410E−01 | −4.7233E−01 | −6.5683E−02 | −2.0117E−03 | −6.7390E−03 |
| A14 = | 2.0387E−02 | 9.1960E−02 | 1.4021E−01 | −3.5582E−03 | −1.4591E−03 | −1.2641E−03 |
| A16 = | −3.2846E−03 | −1.0748E−02 | −1.7533E−02 | 4.8760E−03 | 1.4401E−03 | 6.8597E−03 |

| Surface # | 8 | 9 | 10 | 11 | 12 | 13 |
|---|---|---|---|---|---|---|
| k = | 5.5005E+01 | −2.8299E+01 | 9.0000E+01 | 4.2798E+00 | −3.3500E+01 | −5.1032E+01 |
| A4 = | −1.7243E−01 | 5.9883E−02 | −8.5047E−02 | −4.1521E−02 | −1.7684E−01 | −1.1050E−01 |
| A6 = | 2.4436E−01 | 3.0300E−02 | 4.8796E−01 | 2.4538E−01 | 1.5670E−01 | 6.9226E−02 |
| A8 = | −4.7993E−01 | −2.4569E−01 | −8.8116E−01 | −2.8695E−01 | −1.0610E−01 | −3.4210E−02 |
| A10 = | 7.8261E−01 | 4.3032E−01 | 9.4917E−01 | 2.0861E−01 | 4.6932E−02 | 1.0347E−02 |
| A12 = | −7.4660E−01 | −3.5251E−01 | −5.8749E−01 | −7.5748E−02 | −1.2877E−02 | −1.8292E−03 |
| A14 = | 3.6256E−01 | 1.3637E−01 | 1.9215E−01 | 9.6842E−03 | 1.9744E−03 | 1.6542E−04 |
| A16 = | −6.9942E−02 | −2.0849E−02 | −2.6354E−02 | 1.9078E−04 | −1.2703E−04 | −5.4109E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.96 | SL/TL | 0.91 |
| Fno | 2.23 | f/ImgH | 2.03 |

-continued

| 5th Embodiment | | | |
|---|---|---|---|
| HFOV [deg.] | 22.4 | TL/f | 1.01 |
| Dr1s/Dsr2 | 0.87 | R10/f | −0.80 |
| ΣAT/(T12 + T23) | 12.60 | | |

Moreover, in the optical photographing lens assembly according to the 5th embodiment, when an Abbe number of the first lens element 510 is V1, an Abbe number of the second lens element 520 is V2, an Abbe number of the third lens element 530 is V3, an Abbe number of the fourth lens element 540 is V4, an Abbe number of the fifth lens element 550 is V5, and an Abbe number of the sixth lens element 560 is V6, wherein at least two of the V1, V2, V3, V4, V5 and V6 are smaller than 27, and in the 5th embodiment, V2, V3, V5 and V6 are smaller than 27.

6th Embodiment

Figure 11:
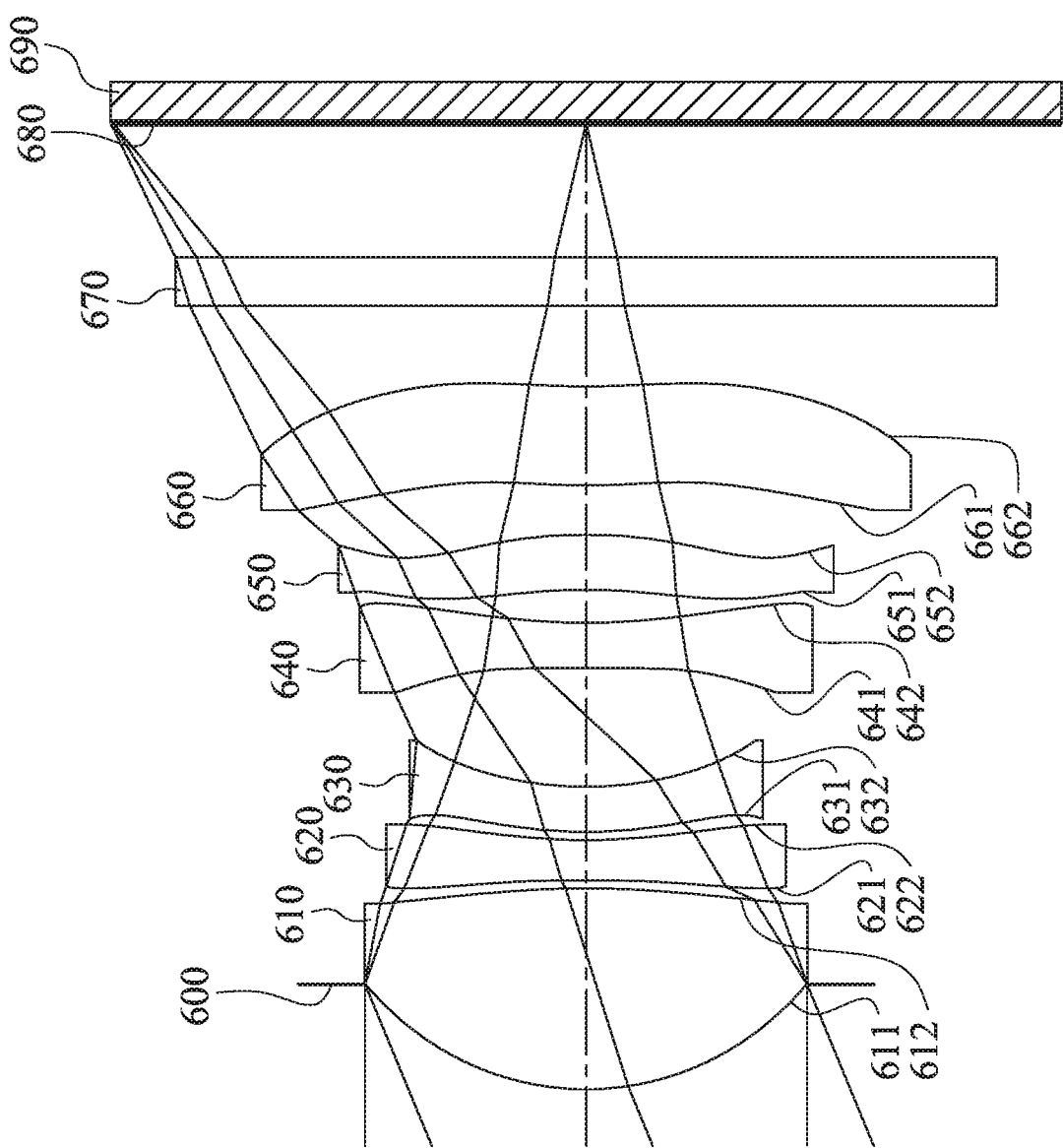
FIG. 11 is a schematic view of an image capturing device according to the 6th embodiment of the present disclosure.
Figure 12:
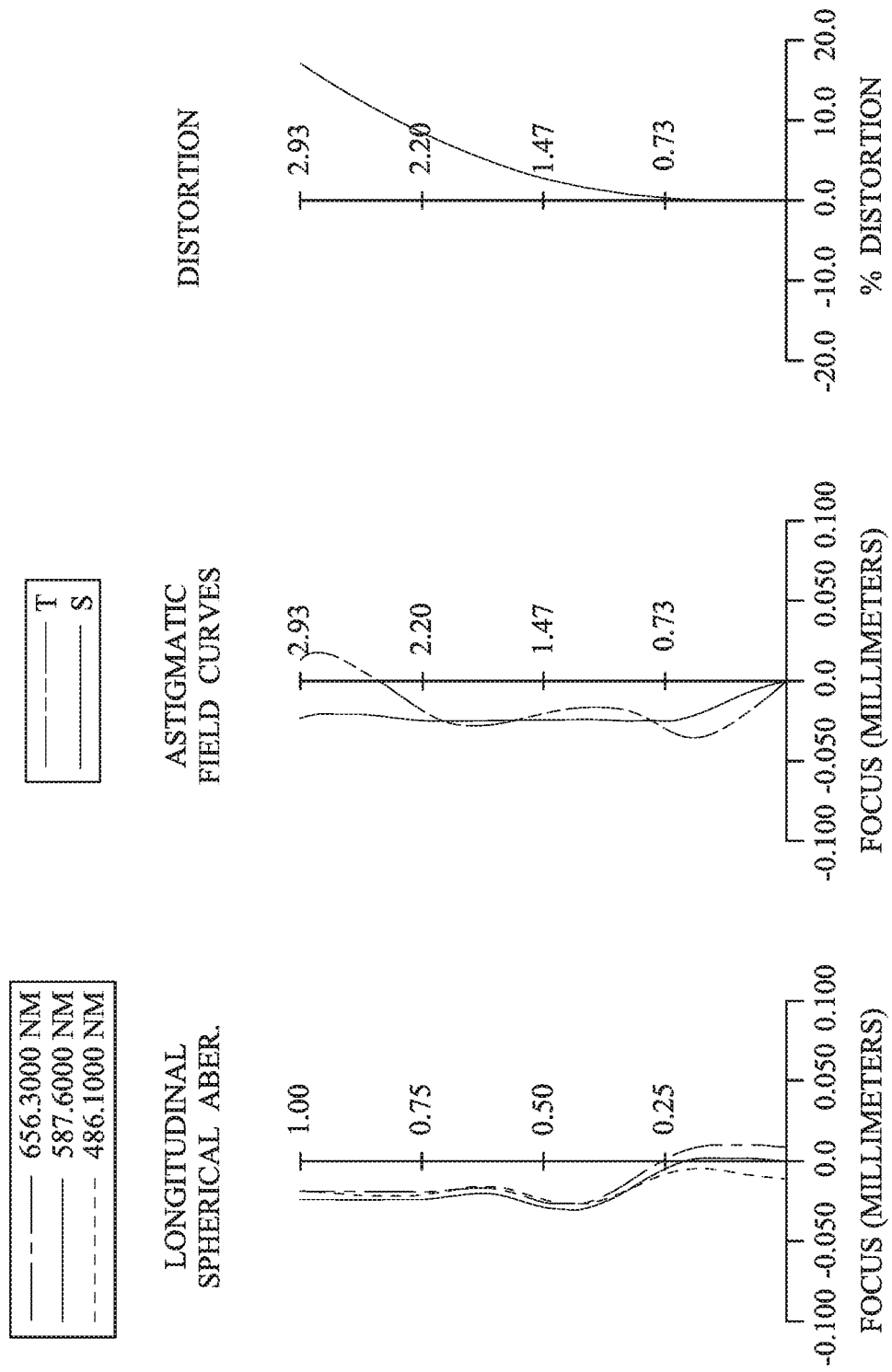
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an optical photographing lens assembly (its reference numeral is omitted) and an image sensor 690. The optical photographing lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680, wherein the image sensor 690 is disposed on the image surface 680 of the optical photographing lens assembly. The optical photographing lens assembly has a total of six lens elements (610-660) with refractive power. There is an air space in a paraxial region between any two of the first lens element 610, the second lens element 620, the third lens element 630, the fourth lens element 640, the fifth lens element 650, and the sixth lens element 660 that are adjacent to each other, and there is no relative movement among the lens elements (610-660) with refractive power.

The first lens element 610 with positive refractive power has an object-side surface 611 being convex in a paraxial region thereof and an image-side surface 612 being convex in a paraxial region thereof. The first lens element 610 is made of plastic material, and has the object-side surface 611 and the image-side surface 612 being both aspheric. Furthermore, the image-side surface 612 of the first lens element 610 has at least one inflection point.

The second lens element 620 with negative refractive power has an object-side surface 621 being concave in a paraxial region thereof and an image-side surface 622 being concave in a paraxial region thereof. The second lens element 620 is made of plastic material, and has the object-side surface 621 and the image-side surface 622 being both aspheric. Furthermore, both of the object-side surface 621 and the image-side surface 622 of the second lens element 620 have at least one inflection point.

The third lens element 630 with negative refractive power has an object-side surface 631 being convex in a paraxial region thereof and an image-side surface 632 being concave in a paraxial region thereof. The third lens element 630 is made of plastic material, and has the object-side surface 631 and the image-side surface 632 being both aspheric. Furthermore, the object-side surface 631 of the third lens element 630 has at least one inflection point.

The fourth lens element 640 with negative refractive power has an object-side surface 641 being convex in a paraxial region thereof and an image-side surface 642 being concave in a paraxial region thereof. The fourth lens element 640 is made of plastic material, and has the object-side surface 641 and the image-side surface 642 being both aspheric. Furthermore, the object-side surface 641 of the fourth lens element 640 has at least one inflection point.

The fifth lens element 650 with negative refractive power has an object-side surface 651 being concave in a paraxial region thereof and an image-side surface 652 being convex in a paraxial region thereof. The fifth lens element 650 is made of plastic material, and has the object-side surface 651 and the image-side surface 652 being both aspheric. Furthermore, the object-side surface 651 of the fifth lens element 650 has at least one inflection point.

The sixth lens element 660 with positive refractive power has an object-side surface 661 being convex in a paraxial region thereof and an image-side surface 662 being concave in a paraxial region thereof. The sixth lens element 660 is made of plastic material, and has the object-side surface 661 and the image-side surface 662 being both aspheric. Furthermore, the image-side surface 662 of the sixth lens element 660 includes at least one convex shape in an off-axial region thereof.

The IR-cut filter 670 is made of glass material and located between the sixth lens element 660 and the image surface 680, and will not affect a focal length of the optical photographing lens assembly.

The detailed optical data of the 6th embodiment are shown in Table 11 and the aspheric surface data are shown in Table 12 below.

TABLE 11

6th Embodiment f = 6.10 mm, Fno = 2.23, HFOV = 22.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.650 | | | | |
| 2 | Lens 1 | 1.735 ASP | 1.244 | Plastic | 1.544 | 55.9 | 2.81 |
| 3 | | −9.747 ASP | 0.050 | | | | |
| 4 | Lens 2 | −42.502 ASP | 0.250 | Plastic | 1.639 | 23.5 | −4.96 |
| 5 | | 3.436 ASP | 0.050 | | | | |
| 6 | Lens 3 | 2.840 ASP | 0.280 | Plastic | 1.639 | 23.5 | −24.65 |
| 7 | | 2.314 ASP | 0.735 | | | | |
| 8 | Lens 4 | 35.286 ASP | 0.280 | Plastic | 1.544 | 55.9 | −7.59 |
| 9 | | 3.686 ASP | 0.206 | | | | |
| 10 | Lens 5 | −3.363 ASP | 0.340 | Plastic | 1.639 | 23.5 | −203.46 |
| 11 | | −3.589 ASP | 0.305 | | | | |
| 12 | Lens 6 | 3.628 ASP | 0.614 | Plastic | 1.639 | 23.5 | 19.30 |
| 13 | | 4.800 ASP | 0.500 | | | | |

TABLE 11-continued

6th Embodiment f = 6.10 mm, Fno = 2.23, HFOV = 22.4 deg.

| Surface # | | Curvature Radius | Thickness | Material | Index | Abbe # | Focal Length |
|---|---|---|---|---|---|---|---|
| 14 | IR-cut filter | Plano | 0.300 | Glass | 1.517 | 64.2 | — |
| 15 | | Plano | 0.833 | | | | |
| 16 | Image | Plano | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | 2.1702E−01 | −8.8681E+00 | −9.0000E+01 | 2.6828E−01 | −2.8095E+00 | −6.1153E−01 |
| A4 = | −1.0567E−02 | −1.9046E−01 | −2.8245E−01 | −1.4732E−01 | −2.6793E−02 | 9.0442E−04 |
| A6 = | 2.1052E−02 | 5.2434E−01 | 7.3202E−01 | 2.6295E−01 | −2.0693E−02 | 9.1173E−02 |
| A8 = | −5.7491E−02 | −7.3043E−01 | −1.0249E+00 | −3.2461E−01 | 2.2285E−03 | −2.5411E−01 |
| A10 = | 7.3458E−02 | 6.2212E−01 | 8.9174E−01 | 2.1809E−01 | −1.5008E−02 | 4.4494E−01 |
| A12 = | −5.3025E−02 | −3.2186E−01 | −4.7157E−01 | −6.9822E−02 | −3.9300E−03 | −4.0791E−01 |
| A14 = | 1.9989E−02 | 9.0264E−02 | 1.3435E−01 | −9.8000E−03 | | 1.8867E−01 |
| A16 = | −3.1967E−03 | −1.0081E−02 | −1.4232E−02 | 1.1080E−02 | | −3.1121E−02 |

| Surface # | 8 | 9 | 10 | 11 | 12 | 13 |
|---|---|---|---|---|---|---|
| k = | −9.0000E+01 | −9.0000E+01 | −8.8179E+01 | 2.8303E+00 | −3.4319E+01 | −1.3097E+01 |
| A4 = | −1.6956E−01 | 8.1436E−02 | −1.9743E−01 | −1.4546E−01 | −2.2522E−01 | −1.6064E−01 |
| A6 = | 1.7129E−01 | −3.1562E−02 | 7.4894E−01 | 3.1016E−01 | 1.7874E−01 | 9.7712E−02 |
| A8 = | −4.4622E−01 | −2.2799E−01 | −1.1991E+00 | −2.2718E−01 | −8.0250E−02 | −4.4608E−02 |
| A10 = | 8.0148E−01 | 4.3806E−01 | 1.1283E+00 | 9.7856E−02 | 2.3186E−02 | 1.5078E−02 |
| A12 = | −7.5357E−01 | −3.5251E−01 | −6.2312E−01 | −1.6984E−02 | −4.7649E−03 | −3.5419E−03 |
| A14 = | 3.5542E−01 | 1.3565E−01 | 1.8645E−01 | −2.1277E−03 | 7.0964E−04 | 4.8806E−04 |
| A16 = | −6.6293E−02 | −2.0577E−02 | −2.3459E−02 | 8.0872E−04 | −5.5612E−05 | −2.9109E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f[mm] | 6.10 | SL/TL | 0.89 |
| Fno | 2.23 | f/ImgH | 2.08 |
| HFOV [deg.] | 22.4 | TL/f | 0.98 |
| Dr1s/Dsr2 | 1.09 | R10/f | −0.59 |
| ΣAT/(T12 + T23) | 13.46 | | |

Moreover, in the optical photographing lens assembly according to the 6th embodiment, when an Abbe number of the first lens element 610 is V1, an Abbe number of the second lens element 620 is V2, an Abbe number of the third lens element 630 is V3, an Abbe number of the fourth lens element 640 is V4, an Abbe number of the fifth lens element 650 is V5, and an Abbe number of the sixth lens element 660 is V6, wherein at least two of the V1, V2, V3, V4, V5 and V6 are smaller than 27, and in the 6th embodiment, V2, V3, V5 and V6 are smaller than 27.

7th Embodiment

Figure 14:
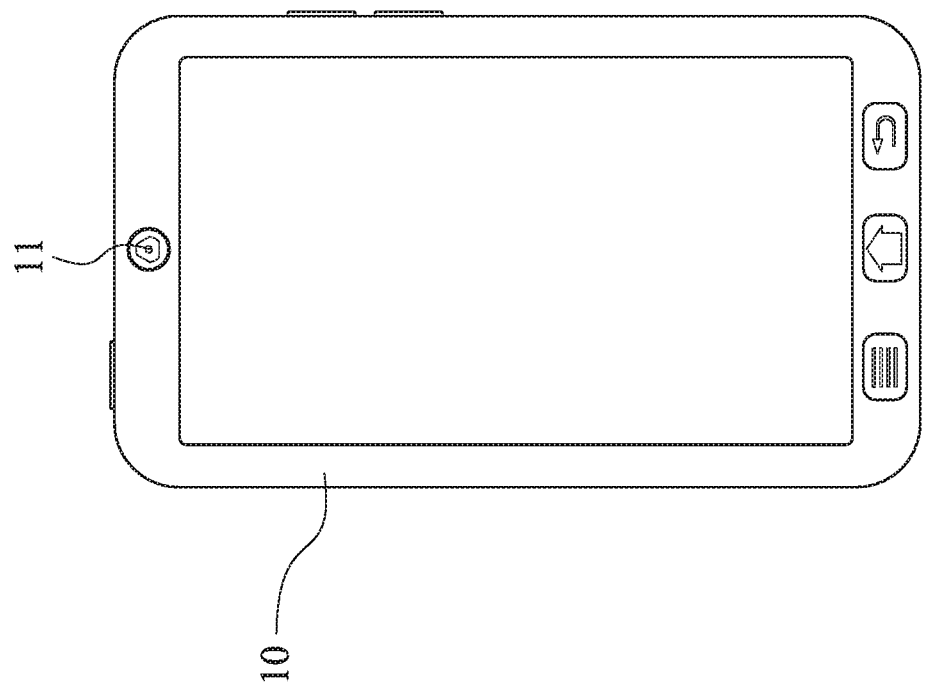
FIG. 14 is a schematic view of an electronic device according to the 7th embodiment of the present disclosure.

FIG. 14 is a schematic view of an electronic device 10 according to the 7th embodiment of the present disclosure. The electronic device 10 of the 7th embodiment is a smart phone, wherein the electronic device 10 includes an image capturing device 11. The image capturing device 11 includes an optical photographing lens assembly (its reference numeral is omitted) according to the present disclosure and an image sensor (its reference numeral is omitted), wherein the image sensor is disposed on an image surface of the optical photographing lens assembly.

8th Embodiment

Figure 15:
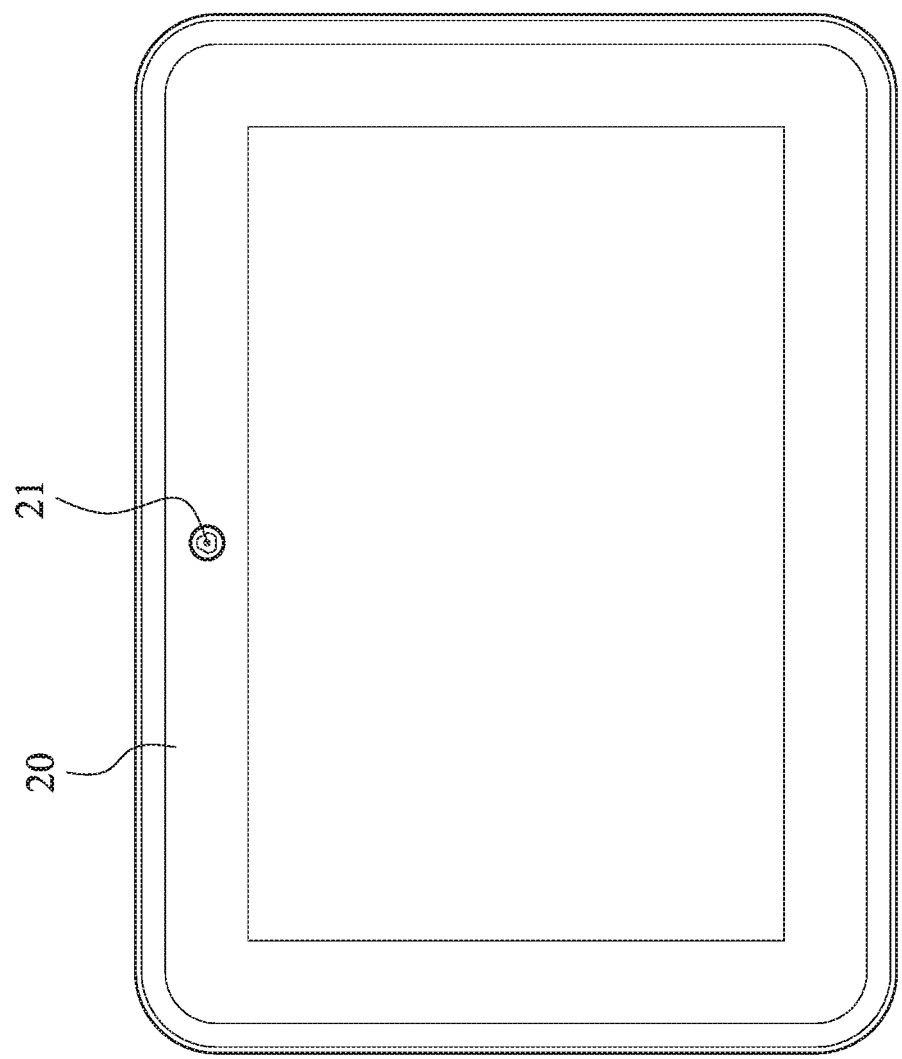
FIG. 15 is a schematic view of an electronic device according to the 8th embodiment of the present disclosure.

FIG. 15 is a schematic view of an electronic device 20 according to the 8th embodiment of the present disclosure. The electronic device 20 of the 8th embodiment is a tablet personal computer, wherein the electronic device 20 includes an image capturing device 21. The image capturing device 21 includes an optical photographing lens assembly (its reference numeral is omitted) according to the present disclosure and an image sensor (its reference numeral is omitted), wherein the image sensor is disposed on an image surface of the optical photographing lens assembly.

9th Embodiment

Figure 16:
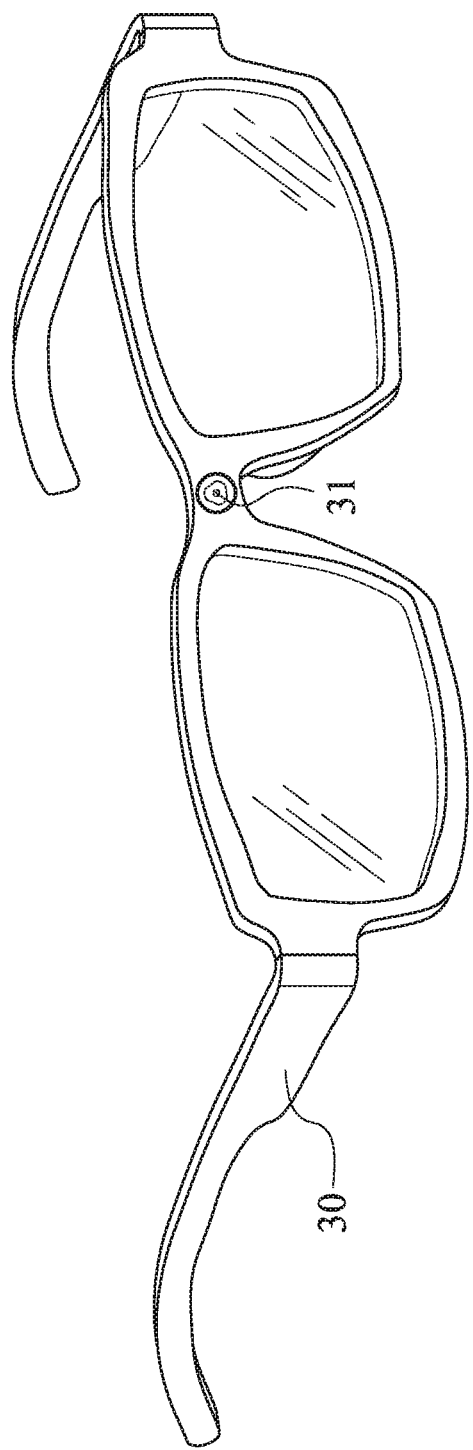
FIG. 16 is a schematic view of an electronic device according to the 9th embodiment of the present disclosure.

FIG. 16 is a schematic view of an electronic device 30 according to the 9th embodiment of the present disclosure.

The electronic device 30 of the 9th embodiment is a head-mounted display (HMD), wherein the electronic device 30 includes an image capturing device 31. The image capturing device 31 includes an optical photographing lens assembly (its reference numeral is omitted) according to the present disclosure and an image sensor (its reference numeral is omitted), wherein the image sensor is disposed on an image surface of the optical photographing lens assembly.

The foregoing description, for purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising six lens elements, the six lens elements being, in order from an object side to an image side:
    a first lens element with positive refractive power having an object-side surface being convex in a paraxial region thereof;
    a second lens element;
    a third lens element;
    a fourth lens element having negative refractive power;
    a fifth lens element comprising at least one inflection point, wherein an object-side surface and an image-side surface of the fifth lens element are both aspheric; and
    a sixth lens element;
    wherein the optical photographing lens assembly has a total of six lens elements; an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, wherein at least three of V1, V2, V3, V4, V5 and V6 are smaller than 27;
    wherein a focal length of the optical photographing lens assembly is f, a maximum image height of the optical photographing lens assembly is ImgH, an axial distance between the object-side surface of the first lens element and an image surface is TL, and the following conditions are satisfied:

$2.0 < f/ImgH$; and $-0.70 < TL/f < 1.15$.

2. The optical photographing lens assembly of claim 1, wherein a half of a maximal field of view of the optical photographing lens assembly is HFOV, and the following condition is satisfied:

10.0 degrees$< HFOV < 25.0$ degrees.

3. The optical photographing lens assembly of claim 1, wherein a sum of all axial distances between adjacent lens elements of the six lens elements is ΣAT, an axial distance between the first lens element and the second lens element is T12, an axial distance between the second lens element and the third lens element is T23, and the following condition is satisfied:

$5.0 < \Sigma AT/(T12+T23)$.

4. The optical photographing lens assembly of claim 1, further comprising:
    an aperture stop disposed between an imaged object and the third lens element.

5. The optical photographing lens assembly of claim 4, wherein an axial distance between the aperture stop and the image surface is SL, the axial distance between the object-side surface of the first lens element and the image surface is TL, and the following condition is satisfied:

$0.85 < SL/TL < 1.05$.

6. The optical photographing lens assembly of claim 1, wherein focal lengths of the fifth lens element and the sixth lens element have different signs.

7. The optical photographing lens assembly of claim 1, wherein each of at least three surfaces among object-side surfaces and image-side surfaces of the first lens element, the second lens element, the third lens element, the fourth lens element and the fifth lens element comprises at least one inflection point.

8. The optical photographing lens assembly of claim 1, wherein the first lens element has an image-side surface being convex in a paraxial region thereof.

9. The optical photographing lens assembly of claim 1, wherein the fifth lens element has an object-side surface being concave in a paraxial region thereof.

10. The optical photographing lens assembly of claim 1, wherein the third lens element has negative refractive power.

11. The optical photographing lens assembly of claim 1, wherein at least three of the six lens elements have negative refractive power.

12. The optical photographing lens assembly of claim 1, wherein the sixth lens element has positive refractive power.

13. The optical photographing lens assembly of claim 1, wherein the third lens element has an object-side surface being convex in a paraxial region thereof and an image-side surface being concave in a paraxial region thereof.

14. An image capturing device, comprising:
    the optical photographing lens assembly of claim 1; and
    an image sensor, wherein the image sensor is disposed on the image surface of the optical photographing lens assembly.

15. An electronic device, comprising:
    the image capturing device of claim 14.

16. An optical photographing lens assembly comprising six lens elements, the six lens elements being, in order from an object side to an image side:
    a first lens element with positive refractive power having an object-side surface being convex in a paraxial region thereof;
    a second lens element having negative refractive power;
    a third lens element having an image-side surface being concave in a paraxial region thereof;
    a fourth lens element;
    a fifth lens element comprising at least one inflection point, wherein an object-side surface and an image-side surface of the fifth lens element are both aspheric; and
    a sixth lens element;
    wherein the optical photographing lens assembly has a total of six lens elements; an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, wherein at least three of V1, V2, V3, V4, V5 and V6 are smaller than 27;

wherein a focal length of the optical photographing lens assembly is f, a maximum image height of the optical photographing lens assembly is ImgH, an axial distance between the object-side surface of the first lens element and an image surface is TL, and the following conditions are satisfied:

$2.0 < f/ImgH$; and $0.70 < TL/f < 1.15$.

17. The optical photographing lens assembly of claim 16, wherein each of at least three surfaces among object-side surfaces and image-side surfaces of the first lens element, the second lens element, the third lens element, the fourth lens element and the fifth lens element comprises at least one inflection point.

18. The optical photographing lens assembly of claim 16, wherein a sum of all axial distances between adjacent lens elements of the six lens elements is ΣAT, an axial distance between the first lens element and the second lens element is T12, an axial distance between the second lens element and the third lens element is T23, and the following condition is satisfied:

$5.0 < \Sigma AT/(T12+T23)$.

19. The optical photographing lens assembly of claim 16, wherein the fifth lens element has negative refractive power.

20. The optical photographing lens assembly of claim 16, wherein the fourth lens element has an image-side surface being concave in a paraxial region thereof.

21. The optical photographing lens assembly of claim 16, wherein the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, wherein at least four of V1, V2, V3, V4, V5 and V6 are smaller than 27.

22. The optical photographing lens assembly of claim 16, wherein at least three of the six lens elements have negative refractive power.

23. The optical photographing lens assembly of claim 16, wherein the third lens element has negative refractive power.

24. The optical photographing lens assembly of claim 16, further comprising:
   an aperture stop disposed between an imaged object and the third lens element.

25. The optical photographing lens assembly of claim 16, wherein focal lengths of the fifth lens element and the sixth lens element have different signs.

26. An image capturing device, comprising:
   the optical photographing lens assembly of claim 16; and
   an image sensor, wherein the image sensor is disposed on the image surface of the optical photographing lens assembly.

27. An electronic device, comprising:
   the image capturing device of claim 26.

* * * * *

UNITED STATES PATENT AND TRADEMARK OFFICE
CERTIFICATE OF CORRECTION

PATENT NO. : 11,391,923 B2
APPLICATION NO. : 16/798486
DATED : July 19, 2022
INVENTOR(S) : Wei-Yu Chen It is certified that error appears in the above-identified patent and that said Letters Patent is hereby corrected as shown below:

In the Claims

In Column 29, Line 56 (in Claim 1), immediately preceding "0.70", please delete "-".

Signed and Sealed this
Twentieth Day of September, 2022

Katherine Kelly Vidal
*Director of the United States Patent and Trademark Office*